US008173262B2

(12) United States Patent
Mutsuda et al.

(10) Patent No.: US 8,173,262 B2
(45) Date of Patent: *May 8, 2012

(54) MOLDED COMPOSITE ARTICLE, PROCESS FOR PRODUCING THE SAME, AND A JOINABLE RESIN

(75) Inventors: Mitsuteru Mutsuda, Himeji (JP); Hiroaki Arita, Himeji (JP); Hajime Komada, Himeji (JP); Toru Ikuta, Kobe (JP)

(73) Assignee: Daicel-Evonik Ltd., Tokyo (JP)

( * ) Notice: Subject to any disclaimer, the term of this patent is extended or adjusted under 35 U.S.C. 154(b) by 1069 days.

This patent is subject to a terminal disclaimer.

(21) Appl. No.: 10/574,265

(22) PCT Filed: Sep. 30, 2004

(86) PCT No.: PCT/JP2004/014359
§ 371 (c)(1),
(2), (4) Date: Mar. 31, 2006

(87) PCT Pub. No.: WO2005/032817
PCT Pub. Date: Apr. 14, 2005

(65) Prior Publication Data
US 2007/0122615 A1    May 31, 2007

(30) Foreign Application Priority Data

Oct. 3, 2003  (JP) ................. 2003-345297
Oct. 17, 2003 (JP) ................. 2003-358542
Oct. 22, 2003 (JP) ................. 2003-361801

(51) Int. Cl.
*B32B 27/34* (2006.01)
*B32B 27/40* (2006.01)
(52) U.S. Cl. .................. 428/423.5; 156/308.2; 264/241
(58) Field of Classification Search ............ 428/423.1, 428/423.5; 156/308.2; 264/241
See application file for complete search history.

(56) References Cited

U.S. PATENT DOCUMENTS

| | | | |
|---|---|---|---|
| 4,410,595 A * | 10/1983 | Matsumoto et al. | 428/412 |
| 5,254,620 A * | 10/1993 | Goetz et al. | 524/538 |
| 5,362,529 A | 11/1994 | Mugge et al. | |
| 5,449,024 A | 9/1995 | Rober et al. | |
| 6,538,073 B1 * | 3/2003 | Oenbrink et al. | 525/420 |
| 6,800,372 B2 | 10/2004 | Ikuta et al. | |
| 7,097,908 B2 * | 8/2006 | Lacroix et al. | 428/423.1 |
| 7,175,916 B2 | 2/2007 | Ikuta et al. | |
| 7,534,494 B2 * | 5/2009 | Wakita et al. | 428/423.5 |
| 2002/0025438 A1 | 2/2002 | Riehs et al. | |
| 2002/0187289 A1 | 12/2002 | Chang et al. | |
| 2003/0118839 A1 * | 6/2003 | Ikuta et al. | 428/425.5 |

FOREIGN PATENT DOCUMENTS

| | | |
|---|---|---|
| AU | 674465 B * | 12/1996 |
| CN | 1122583 A | 5/1996 |
| EP | 0 382 236 A2 | 8/1990 |
| EP | 0 392 847 A2 | 10/1990 |
| JP | 49-6024 | 1/1974 |
| JP | 54-3181 A | 1/1979 |
| JP | 60-9900 B2 | 3/1985 |
| JP | 2-70724 A | 3/1990 |
| JP | 2-292040 A | 12/1990 |
| JP | 4-363221 A | 12/1992 |
| JP | 7-125155 A | 5/1995 |
| JP | 7-308205 A | 11/1995 |
| JP | 8-505333 A | 6/1996 |
| JP | 8-267585 A | 10/1996 |
| JP | 8-267587 A | 10/1996 |
| JP | 9-248201 A | 9/1997 |
| JP | 2001-10004 A | 1/2001 |
| JP | 2001-179871 A | 7/2001 |
| JP | 2002-273826 A | 9/2002 |
| JP | 2004-161964 A | 6/2004 |
| WO | WO 95/12481 A1 | 5/1995 |
| WO | WO-95/12481 A1 | 5/1995 |
| WO | WO 02/055296 A1 | 7/2002 |
| WO | WO 02/055297 A1 | 7/2002 |
| WO | WO 2004/050363 A1 | 6/2004 |

OTHER PUBLICATIONS

English Translation of Office Action mailed Aug. 8, 2008 in corresponding Chinese Application No. 2004800361358.
English Translation of Notification of Reasons for Refusal mailed Jul. 1, 2008 in corresponding Japanese Application No. JP-2003-345297.
Notification of Reasons for Refusal issued on Apr. 27, 2010, in Japanese Application No. JP-2004-304798.
Supplementary European Search Report dated Apr. 21, 2011, issued in European Patent Application No. 04788387.1.
European Search Report issued Dec. 3, 2010, in European Patent Application No. 03777168.0.

* cited by examiner

*Primary Examiner* — Callie Shosho
*Assistant Examiner* — John Freeman
(74) *Attorney, Agent, or Firm* — Birch, Stewart, Kolasch & Birch, LLP

(57) ABSTRACT

In a molded composite article, a resin member comprising a non-urethane thermoplastic resin and a resin member comprising a thermoplastic polyurethane resin are directly joined with each other. The non-urethane thermoplastic resin comprises at least one member selected from the group consisting of a polyamide component having an alicyclic ring and an amino group-containing compound, or each of the non-urethane thermoplastic resins and the thermoplastic polyurethane has a polyether segment. Even if the base resin is a non-urethane thermoplastic resin, the present invention provides a direct and firm bonding between the non-urethane thermoplastic resin member and the thermoplastic polyurethane resin member.

14 Claims, No Drawings

MOLDED COMPOSITE ARTICLE, PROCESS FOR PRODUCING THE SAME, AND A JOINABLE RESIN

TECHNICAL FIELD

The present invention relates to a joinable or bondable resin (or a joinable or bondable resin composition) suitable for joining to a resin member comprising a thermoplastic polyurethane in a one-piece construction without an adhesive, a molded composite article (or composite molded article) in which a resin member comprising the above resin is joined to a thermoplastic polyurethane resin member in a one-piece construction, and a process for producing the same.

BACKGROUND ART

In order to improve design or decorative property or excellent touch or texture (e.g., soft texture), or in order to impart higher functionalities, there have been proposed composites (molded composite articles) formed with a combination of a plurality of resins each having a different hardness, for example, a molded composite article in which at least a part of a resin molded article is coated with a thermoplastic elastomer. Such a molded composite article is usually produced by adhesion of a plurality of molded members through an adhesive. For example, Japanese Patent Application Laid-Open No. 267585/1996 (JP-8-267585A) (Patent document 1) discloses a resin molded article in which a plurality of resin molded articles formed with a polyamide resin or others are weld or adhered to each other through a finishing agent such as a urethane polymer or a urethane-series adhesive. However, such a process using an adhesive is not only uneconomical due to complicated steps, but also has problems such as environmental pollution by an organic solvent or others. Furthermore, in the case where such a resin molded article is small in adhesive area or needs (or requires) fine patterns, production of such a resin molded article on a commercial or industrial basis is difficult because not only a coating step of an adhesive becomes quite complicated, but also bonded strength or bonded stability of the resin molded article is insufficient.

On the other hand, from the viewpoint of rationalization of production processes or environmental protection, a process for direct thermal fusing of a plurality of molded members has been adopted. The molded composite article obtained by thermal fusing is usually manufactured by a molding process such as a two-color (or double) molding or an insert molding. However, combination of materials which are different in species and are acceptable for thermal fusing is significantly limited, and in many cases the combination is only limited to the same kind of materials. Moreover, it is not easy to establish molding conditions for obtaining enough bonded strength. Therefore, in order to reinforce the fused part, such a method is utilized in addition to thermal fusing or welding, that a method for preparing a concavo-convex site (or part) in an area to be bonded of the molded member for mechanical joining, a method for chemically activating a surface of the molded member by a corona discharge treatment or the like, a method for coating a primer or others on an area to be bonded, or other methods. In such a method, however, the molded composite article is deteriorated in flexuous property. For example, the hardened primer layer easily forms a crack with bending. Moreover, the method tends to require a complicated structure of the molded member, or increases the number of production steps. As a result, such a method has many disadvantages in quality of product and economic circumstances.

In order to solve these problems, it has been investigated to use a thermoplastic polyurethane as a material for a resin member constituting a molded composite article. The thermoplastic polyurethane itself is relatively excellent in adhesiveness. For example, in a usage (or purpose) of shoe(s), a molded composite plastic article comprising a polyamide resin and a thermoplastic polyurethane is practically used as a shoe sole. For example, Japanese Patent Application Laid-Open No. 248201/1997 (JP-9-248201A) (Patent document 2) proposes a centroid body for a cycling shoe, which comprises a shoe sole member formed with a polyamide resin reinforced with a glass fiber as an insert, wherein a sidewall of the shoe sole member is molded with a polyurethane resin. However, since such a usage exposes the centroid body to a mechanically severe condition, the reference describes in Examples, that a through-hole in the polyamide resin shoe sole member is needed for mechanical conjunction of the sole member with the polyurethane resinous sidewall member. Moreover, Japanese Patent Application Laid-Open No. 308205/1995 (JP-7-308205A) (Patent document 3) proposes a shoe sole reinforced by replacing at least a part of the outsole composed of a polyurethane resin with a fiber reinforced polyamide resin sheet. This reference discloses that the polyamide resin comprises a mixture of a polyamide and a polyolefin (an ionomer) in order to obtain bonding or joining properties tolerant to heavy bending of the shoe sole. As apparent from these references, for the usage of shoe soles and others which require excellent mechanical properties or bending or flexing fatigue resistance, it has been watched to combine a thermoplastic polyurethane resin excellent in bonding properties by itself and a polyamide resin surpassing in mechanical properties. In general, since a thermoplastic polyurethane-series resin itself has a bondability to a polyamide-series resin to a certain degree, in adequate conditions such as material temperature in bonding or others, a molded composite article is obtainable which has a bonded strength durable to the practical use. However, in the case where high bending or flexing fatigue resistance is required to the bonded surface, or where using environment of bonded member is extremely severe, much higher (one-step higher) bonded strength than the above molded composite article is required. That is, bondability (strength) of members obtained by thermal fusing or welding is insufficient, and further ingenuity or improvement is necessary.

Among the field of these shoe soles, in the field of athletic shoe such as a succor, baseball, or basketball shoe, in order to obtain higher flexibility as a shoe sole as well as strong bondability between materials, there is widely employed a molded composite article combining a polyurethane resin and a polyamide-series elastomer having not only high flexibility and toughness but also excellent bondability (that is, an elastomer in which a polyamide-series resin is softened by introduction of a polyether component).

For example, Japanese Patent Application Laid-Open No. 505333/1996 (JP-8-505333A) (Patent document 4) discloses that a lightened shoe sole is obtained by injection-molding a polyamide elastomer containing a foaming agent into a mold, with inserting or putting a molded article of a thermoplastic resin such as a polyether amide, a polyether ester or a polyurethane in a mold, and adhering to the thermoplastic resin molded article (un-lightweight (un-lightened) plastic) and the elastomer (lightweight thermoplastic elastomer). Japanese Patent Application Laid-Open No. 125155/1995 (JP-7-125155A) (Patent document 5) discloses a molded composite article in which a rigid plastic molded member formed of a blended matter of a polypropylene and a polyamide is coated with a non-rigid (or flexible) plastic containing a thermoplastic polyurethane and a plasticizer by thermal fusing. However, even in such a molded composite article (for example, a molded composite article using a polyurethane resin), the adhesive strength between two materials (e.g., an adhesive strength relative to a polyamide elastomer as a counterpart member) has not been enough yet. Therefore, such a composite is affected by not only conditions for molding or conditions of materials to be used (e.g., production lot) but also using environment of the product (molded composite article), resulting in unstableness of the bonded strength or the duration of the molded composite article (particularly the duration of the adhered site).

Among the combinations of a polyurethane resin and a polyamide-series elastomer, in both practical use in market and the examples of the Patent Document 4, a polyether-series polyurethane resin is used as the polyurethane resin, and as a matter of fact, the composite comprising a polyester-series polyurethane resin and a polyamide-series elastomer is not produced. However, the polyester-series polyurethane resin is excellent in mechanical properties and economical efficiency than the polyether-series polyurethane resin. Therefore, not limited to the market of an athletic shoe, in all the field utilizing a composite of a polyurethane-series resin and a polyamide-series resin, it is a great issue in terms of both technical and commercial subjects that both polyether-series polyurethane resin and a polyester-series polyurethane resins are used with no distinction in technology development for a composite.

Further, Japanese Patent Application Laid-Open No. 273826/2002 (JP-2002-273826A) (Patent document 6) discloses a composite comprising a combination of a vulcanized rubber member in which a rubber is vulcanized with a radical-generating agent and a resin member comprising a thermoplastic resin having at least two hydrogen or sulfur atoms per molecule on average, wherein the hydrogen or sulfur atom has an orbital interaction energy coefficient S of not less than 0.006. However, this method needs compulsory contact both members with each other with heating both members (usually at a temperature of not less than 160° C.) for a given length of time (usually not less than 7 minutes) due to necessity of a crosslinking agent for binding both members. Therefore, in fact, in some final product configurations of the composite, this method is unusable for a material having low heat-resistance, particularly the material having a deflection temperature of not more than 100° C. under a load of 0.45 MPa defined by ISO 175. Moreover, in the case of using a material having relatively a high heat-resistance, it is difficult to obtain a molded composite article having a high dimensional accuracy because the exposure to the condition of a high temperature and a high pressure for a long period inevitably causes physical developments such as expansion and contraction in the molded composite article.

Patent Document 1: JP-8-267585A (Claims)
Patent Document 2: JP-9-248201A
Patent Document 3: JP-7-308205A
Patent Document 4: JP-8-50533A
Patent Document 5: JP-7-125155A (Claims)
Patent Document 6: JP-2002-273826A

DISCLOSURE OF THE INVENTION

Problems to be Solved by the Invention

It is therefore an object of the present invention to provide a molded composite article improved dramatically in bonded strength in which, even using a non-urethane-series resin member and a thermoplastic polyurethane-series resin member different in character from each other, the both members are directly and firmly joined together without an adhesive; and a process for producing the same.

It is another object of the present invention to provide a molded composite article comprising a polyamide-series resin member and a thermoplastic polyurethane-series resin member, in which the both members are firmly joined or bonded together regardless of kinds of the thermoplastic polyurethane-series to be used; and a process for producing the same.

It is still another object of the present invention to provide a joinable resin (or resin composition) firmly joinable or bondable to a thermoplastic urethane-series resin member without an adhesive regardless of comprising a non-urethane-series thermoplastic resin as a base resin.

It is a further object of the present invention to provide a joinable resin (or resin composition) improving joinability (or joining property) to a thermoplastic urethane-series resin member independent of the kinds of base resin.

It is another object of the present invention to provide a joinable resin (or resin composition) firmly joinable to a thermoplastic urethane-series resin member without deteriorating base resin properties.

It is still another object of the present invention to provide a process for producing a molded composite article in which a non-urethane-series resin member and a thermoplastic polyurethane resin member are firmly joined together by thermal fusing in a convenient manner for a short period without going through complicated production steps.

Means to Solve the Problems

The inventors of the present invention made intensive studies to achieve the above objects and finally found that (I-1) introduction of an alicyclic ring (or an aliphatic ring) to at least a part of a polyamide component constituting a polyamide-series resin realizes extremely higher bonded strength to a thermoplastic polyurethane-series resin than a polyamide-series resin comprising a general aliphatic amide component, and further ensures, regardless of the kinds of polyurethane-series resins, firm or strong joining of the polyamide-series resin to a polyester-series polyurethane resin in the similar (or comparable) joining degree with a polyether-series polyurethane resin; that (I-2) a non-urethane-series thermoplastic resin (resin composition) containing an amino group-containing compound shows high joinability to a thermoplastic polyurethane-series resin, thereby a resin member comprising the non-urethane-series thermoplastic resin and a resin member comprising the thermoplastic polyurethane-series resin are firmly bonded or joined with each other; and that (II) the combination of a polyamide-series resin and a thermoplastic polyurethane-series resin both of which have a polyether segment achieves firm joining or bonding of both resin members due to enhancement of affinity between both resins.

That is, the molded composite article of the present invention is a molded composite article in which a resin member comprising a non-urethane-series thermoplastic resin and a resin member comprising a thermoplastic polyurethane-series resin are directly joined with each other, wherein the non-urethane-series thermoplastic resin is a non-urethane-series thermoplastic resin (resin(Ib)) or (resin (IIb)), and the non-urethane-series thermoplastic resin and the thermoplastic polyurethane-series resin fulfill a following requirement (Ia) or (IIa), (Ia): the non-urethane-series thermoplastic resin (Ib) comprises at least one member selected from the group consisting of a polyamide component having an alicyclic ring, and an amino group-containing compound, or (IIa): each of the non-urethane-series thermoplastic resin (IIb) and the thermoplastic polyurethane-series resin has a polyether segment. Incidentally, the non-urethane-series thermoplastic resin may include a non-urethane-series thermoplastic resin mode, as well as a mixture mode comprising a non-urethane-series thermoplastic resin and an amino group-containing compound. For example, the non-urethane-series thermoplastic resin (Ib) may be (Ib-1) a resin comprising a polyamide component having an alicyclic ring, or (Ib-2) a resin composition comprising a non-urethane-series thermoplastic resin and an amino group-containing compound.

In the non-urethane-series thermoplastic resin (Ib), the polyamide component having an alicyclic ring may be at least one member selected from the group consisting of an alicyclic polyamide-series resin and an alicyclic polyamide elastomer. Moreover, the polyamide component having an alicyclic ring may comprise an alicyclic polyamide component (such as an alicyclic polyamide-series resin, an alicyclic polyamide elastomer or an alicyclic polyamide oligomer) and a non-alicyclic polyamide component (such as an aliphatic polyamide-series resin or an aromatic polyamide-series resin). The polyamide-series resin having the alicyclic ring may be a polyamide component obtained by using an alicyclic diamine as a diamine component. The non-urethane-series thermoplastic resin (Ib) may comprise a polyamide-series resin, and the proportion (molar ratio) of an alicyclic monomer residue relative to other monomer residue in all polyamide components constituting the polyamide-series resin may be the former/the latter=about 100/0 to 0.1/99.9.

The non-urethane-series thermoplastic resin (Ib) may be (Ib-2) a resin composition which comprises an amino group-containing compound and a non-urethane-series thermoplastic resin, and the non-urethane-series thermoplastic resin may comprise at least one member selected from the group consisting of a polyamide-series resin, a polyester-series resin, a polycarbonate-series resin, a polyphenylene sulfide-series resin, a polysulfone-series resin, a thermoplastic polyimide-series resin, a polyetherketone-series resin, an olefinic resin, a styrenic resin, a (meth)acrylic resin, and a halogen-containing vinyl-series resin. The amino group-containing compound may have a plurality of primary amino groups in the molecule. The amino group-containing compound may have an amino group in a concentration of 40 to 1000 mmol/kg. The amino group-containing compound may be a polyamide oligomer having a number average molecular weight of 500 to 10,000 and an amino group in a concentration of 50 to 700 mmol/kg. The proportion of the amino group-containing compound may be about 0.01 to 20 parts by weight relative to 100 parts by weight of the non-urethane-series thermoplastic resin. The resin composition (Ib-2) may contain a non-urethane-series thermoplastic resin selected from the group consisting of a polyamide-series resin, a polyester-series resin, a polycarbonate resin and a polyphenylene sulfide-series resin; and an amino group-containing compound.

The non-urethane-series thermoplastic resin (Ib) may have an amino group in a concentration of not less than 10 mmol/kg.

The thermoplastic polyurethane-series resin may be a polyester urethane elastomer or a polyether urethane elastomer. In the molded composite article (Ia), the resin member comprising the non-urethane-series thermoplastic resin (Ib) may be directly joined to the resin member comprising at least one thermoplastic polyurethane-series resin selected from the group consisting of a polyester urethane elastomer and a polyether urethane elastomer.

In the molded composite article (IIa), the non-urethane-series thermoplastic resin (IIb) having a polyether segment may comprise a polyamide elastomer having a polyoxy$C_{2-4}$alkylene segment as a soft segment. The non-urethane-series thermoplastic resin having a polyether segment may comprise a polyamide elastomer comprising a polyamide segment and a polyether segment, and the proportion (weight ratio) of the polyamide segment relative to the polyether segment may be, the former/the latter=about 9/1 to 2.5/7.5. The thermoplastic polyurethane-series resin having a polyether segment may comprise a thermoplastic polyether urethane elastomer having a polyoxy$C_{2-4}$alkylene segment as a soft segment. Moreover, at least one member out of the non-urethane-series thermoplastic resin and the thermoplastic polyurethane-series resin may comprise at least a polytetramethylene glycol (a polytetramethylene ether unit). The proportion of the polyether segment in the non-urethane-series thermoplastic resin (IIb) may be about 10 to 90% by weight relative to the whole resin, and the proportion of the polyether segment in the thermoplastic polyurethane-series resin may be about 10 to 90% by weight relative to the whole resin.

The molded composite article of the present invention is suitable for a component member of a shoe or a machine part (e.g., a roll).

The joinable resin of the present invention is a non-urethane-series thermoplastic resin (non-urethane-series resin) directly joinable to a thermoplastic polyurethane-series resin, which is a non-urethane-series thermoplastic resin (Ib) or (IIb), and the non-urethane-series thermoplastic resin (Ib) comprises at least one member selected from the group consisting of a polyamide component having an alicyclic ring and an amino group-containing compound, or the non-urethane-series thermoplastic resin (IIb) comprises a non-urethane-series thermoplastic resin which has a polyether segment and is directly joinable to the thermoplastic polyurethane-series resin having a polyether segment. The non-urethane-series thermoplastic resin (Ib) may have an amino group in a concentration of not less than 10 mmol/kg.

Moreover, the present invention includes a process for producing the molded composite article, which comprises heating at least one resin selected from the group consisting of the non-urethane-series thermoplastic resin and the thermoplastic polyurethane-series resin, and joining the both resins with each other. For example, by heating at least one resin selected from the group consisting of the non-urethane-series thermoplastic resin and the thermoplastic polyurethane-series resin to be molten, and bringing at least one resin in the molten state into contact with the other resin, both resins may be joined (or bonded) with each other. Moreover, the joining may be conducted either by heating the thermoplastic polyurethane-series resin to be molten, and bringing the thermoplastic polyurethane-series resin in the molten state into contact with a part of a resin member comprising the non-urethane-series thermoplastic resin, or by heating the non-urethane-series thermoplastic resin to be molten, and bringing the non-urethane-series thermoplastic resin in the molten state into contact with a part of a resin member comprising the thermoplastic polyurethane-series resin. Furthermore, the joining may be conducted by heating each of the non-urethane-series thermoplastic resin and the thermoplastic polyurethane-series resin, and bringing the thermoplastic polyurethane-series resin in the molten state into contact with the non-urethane-series thermoplastic resin in the molten state. Moreover, the non-urethane-series thermoplastic resin and the thermoplastic polyurethane-series resin may be joined with each other in the molding process by a molding method selected from the group consisting of a thermoforming, an injection molding, an extrusion molding, and a blow molding.

Incidentally, throughout this specification, the meaning of the term "resin" sometimes includes "a resin composition". Moreover, throughout this specification, the term "adhesion (or adhering)" means a technique for compounding a plurality of members through an adhesive, the term "joining (or bonding)" means a technique for compounding a plurality of members without an adhesive, and the both terms are distinguished from each other. Fusing (or thermal fusing) is one embodiment of joining.

Effects of the Invention

In the present invention, since the polyamide-series resin contains a polyamide component having an alicyclic ring, the molded composite article comprising a polyurethane-series resin member and a polyamide-series resin member ensures to have the significantly improved bonded strength or (joined strength) between both resin members. Moreover, independent of the species of thermoplastic polyurethane-series resin to be used, both resin members can be firmly joined or bonded with each other. Accordingly, for example, a molded composite article comprising a polyurethane-series resin member having excellent mechanical properties and a polyamide-series elastomer member or the like, is also useful for the field of an athletic shoe requiring flexibility or plasticity of whole molded composite article.

Furthermore, since the present invention employs a non-urethane-series thermoplastic resin composition containing an amino group-containing compound, in spite of using a non-urethane-series thermoplastic resin as a base resin, the non-urethane-series thermoplastic resin composition can be firmly or strongly joined or bonded to a thermoplastic urethane-series resin member without an adhesive. Moreover, an amino group-containing compound achieves improvement in joinability of the non-urethane-series thermoplastic resin to the thermoplastic urethane-series resin member regardless of the species of the base resin. Furthermore, in the case where the resin composition contains a polyamide oligomer, without deteriorating properties of the base resin, the resin composition can be firmly joined to the thermoplastic urethane-series resin member. In the molded composite article of the present invention, combination of the above-mentioned resin composition and the thermoplastic polyurethane-series resin ensures direct and strong bonding or joining of the non-urethane-series resin member with the thermoplastic polyurethane-series resin member without an adhesive, regardless of the different properties of the above resin members.

Further, according to the present invention, since the polyamide-series resin having a polyether segment is combined with the thermoplastic polyurethane-series resin having a polyether segment, in spite of difference in properties between the polyamide-series resin and the thermoplastic polyurethane-series resin, by enhancing the affinity between the polyamide-series resin and the thermoplastic polyurethane-series resin, direct and strong bonding or joining of the polyamide-series resin member with the thermoplastic polyurethane-series resin member is achieved without an adhesive.

Moreover, according to the process of the present invention, a molded composite article is producible in which a non-urethane-series resin member and a thermoplastic polyurethane resin member are firmly joined together by thermal fusing in a simple manner without going through complicated production steps. In particular, a molded composite article is also producible in a short period of time.

DETAILED DESCRIPTION OF THE INVENTION

[Molded Composite Article]

The molded composite article of the present invention is a molded composite article in which a resin member comprising a non-urethane-series (or -based) thermoplastic resin (or urethane-free thermoplastic resin) and a resin member comprising a thermoplastic polyurethane-series (or -based) resin are directly joined with each other. In the molded composite article, the non-urethane-series thermoplastic resin is a non-urethane-series thermoplastic resin (resin (Ib)) or (IIb), and the non-urethane-series thermoplastic resin and the thermoplastic polyurethane-series resin fulfill a following requirement (Ia) or (IIa), (Ia): the non-urethane-series thermoplastic resin (Ib) comprises at least one member selected from the group consisting of a polyamide component having an alicyclic ring (an alicyclic ring-containing polyamide component), and an amino group-containing compound, or (IIa): each of the non-urethane-series thermoplastic resin (IIb) and the thermoplastic polyurethane-series resin has a polyether segment. The molded composite article of the requirement (Ia) may be a molded composite article (Ia-1) in which the resin (Ib) comprises a resin (resin (Ib-1)) comprising a polyamide component having an alicyclic ring, or may be a molded composite article (Ia-2) in which the resin (Ib) comprises a resin composition (resin composition (Ib-2)) containing a non-urethane-series (or -based) thermoplastic resin and an amino group-containing compound.

Further, the present invention may include a non-urethane-series (or non-urethane-based, urethane-free) thermoplastic resin (or resin composition) directly joinable to the thermoplastic polyurethane-series resin. This non-urethane-series thermoplastic resin may be (Ib) a resin which comprises at least one member selected from the group consisting of a polyamide component having an alicyclic ring and an amino group-containing compound, or (IIb) a resin which has a polyether segment and is directly joinable to the thermoplastic polyurethane-series resin having a polyether segment. The resin (Ib) may be the resin (Ib-1) or the resin composition (Ib-2).

(Non-Urethane-Series Thermoplastic Resin)

(I-b) Non-Urethane-Series Thermoplastic Resin Comprising a Polyamide Component having an Alicyclic Ring The non-urethane-series thermoplastic resin (Ib-1) constituting the above molded composite article (Ia-1) comprises a polyamide component having an alicyclic ring (alicyclic polyamide component), and is usually a polyamide-series resin (or resin composition) which comprises a polyamide component having an alicyclic ring. As such a polyamide component, there may be exemplified (a) a single use of an alicyclic polyamide component such as an alicyclic polyamide-series resin or an alicyclic polyamide elastomer, or an alloy or blend (mixture) thereof, and (b) a polyamide-series resin composition comprising an alicyclic polyamide component (such as an alicyclic polyamide-series resin, an alicyclic polyamide elastomer, or an alicyclic polyamide oligomer) and a non-alicyclic polyamide component such as an aliphatic polyamide-series resin or an aromatic polyamide-series resin.

(a) Single use of Alicyclic Polyamide Component or a Combination Thereof.

The alicyclic polyamide component may be a single component of an alicyclic polyamide-series resin or elastomer, or may be an alloy or blend component in which an alicyclic polyamide-series resin and an alicyclic polyamide elastomer are combined.

The alicyclic polyamide-series resin is an alicyclic polyamide-series resin having an alicyclic ring in the main chain or side chain of the molecule, and usually has an alicyclic ring in the main chain. As the alicyclic polyamide-series resin, for example, an alicyclic polyamide can be employed which is obtainable by using at least one alicyclic monomer selected from the group consisting of an alicyclic diamine and an alicyclic dicarboxylic acid as a monomer component. The alicyclic polyamide may be either a homopolyamide or a copolyamide.

The alicyclic polyamide-series resin may be a polyamide obtainable from polymerization of the alicyclic monomers, or may be obtained by polymerization of the alicyclic monomer and other copolymerizable monomer. The other copolymerizable monomer may be an aromatic monomer such as an aromatic diamine or an aromatic dicarboxylic acid, and preferably an aliphatic monomer such as an aliphatic diamine and/or an aliphatic dicarboxylic acid from the viewpoint of flexibility or plasticity. Further, in terms of joinability, an alicyclic diamine is preferably used as the alicyclic monomer, and the combination of an alicyclic diamine and an aliphatic dicarboxylic acid is particularly preferred. The alicyclic polyamide-series resin obtained from the alicyclic monomer and an aliphatic monomer together is high in transparency, and is known as a so-called transparent polyamide.

As the alicyclic diamine, there may be exemplified a saturated alicyclic diamine [e.g., a diaminocycloalkane (preferably a diamino$C_{5-12}$cycloalkane) such as diaminocyclopentane, 1,4-diaminocyclohexane, 1,3-diaminocyclohexane, 1,2-diaminocyclohexane, diaminocycloheptane, or hydrogenated naphthalenediamine], an unsaturated alicyclic diamine [e.g., a diaminocycloalkene (preferably $C_{5-12}$cycloalkene) such as 1,2-diaminocyclohexene, or 1,3-diaminocyclohexene], a hydrogenated diphenyl-series diamine [e.g., a bis(aminocycloalkyl)alkane (preferably a bis(amino$C_{5-8}$cycloalkyl)$C_{1-6}$alkane) such as 4,4'-diaminohydrogenated biphenyl, bis(4-aminocyclohexyl)methane, bis(4-amino-3-methylcyclohexyl)methane, bis(4-amino-2-methylcyclohexyl)methane, or 2,2-bis(4-aminocyclohexyl)propane; a bis(4-aminocycloalkane)cycloalkane (preferably a bis(amino$C_{5-8}$cycloalkyl)$C_{5-12}$cycloalkane) such as bis(4-aminocyclohexyl)cyclohexane; bis(4-aminocyclohexyl)ketone; bis(4-aminocyclohexyl)sulfoxide; and 4,4'-diaminodicyclohexylether], a crosslinked cyclic alkanediamine (e.g., a di- or tricyclo$C_{7-10}$alkane-diamine such as bornanediamine, norbornanediamine, or adamantanediamine), a crosslinked cyclic alkene-diamine (e.g., a di- or tri cyclo$C_{7-10}$alkene-diamine such as bornenediamine or norbornenediamine), and others. These alicyclic diamines can be used singly or in combination. Among these alicyclic diamines, a diamine containing an amino$C_{5-10}$cycloalkane, particularly a $C_{6-8}$cycloalkanediamine or a bis($C_{6-8}$cycloalkyl)$C_{1-4}$alkanediamine is preferred.

The diamine component may also include an aliphatic diamine or an aromatic diamine. The aliphatic diamine may include, for example, a $C_{4-16}$alkylenediamine (preferably a $C_{4-14}$alkylenediamine, particularly a $C_{6-12}$alkylenediamine) such as tetramethylenediamine, hexamethylenediamine, or dodecanediamine. The aromatic diamine may include, for example, methaxylylenediamine, phenylenediamine and others. These diamine components can be used singly or in combination. Among these diamine components, the aliphatic diamine is preferred from the viewpoint of flexibility or plasticity.

As the alicyclic dicarboxylic acid, there may be exemplified a saturated alicyclic dicarboxylic acid [e.g., a cycloalkanedicarboxylic acid (preferably a $C_{5-12}$cycloalkane-dicarboxylic acid) such as cyclopenetanedicarboxylic acid, cyclohexane-1,4-dicarboxylic acid, cyclohexane-1,3-dicarboxylic acid, cyclohexane-1,2-dicarboxylic acid, or cycloheptanedicarboxylic acid], an unsaturated alicyclic dicarboxylic acid [e.g., a cycloalkenedicarboxylic acid (preferably a $C_{5-12}$cycloalkene-dicarboxylic acid) such as cyclohexene-1,2-dicarboxylic acid or cyclohexene-1,3-dicarboxylic acid], a hydrogenated diphenyl-series dicarboxylic acid [e.g., a bis(carboxycycloalkyl)alkane (preferably a bis(carboxy$C_{5-8}$cycloalkyl)$C_{1-6}$alkane) such as hydrogenated biphenyl-4,4'-dicarboxylic acid, bis(4-carboxycyclohexyl)methane, bis(4-carboxy-3-methylcyclohexyl)methane, bis(4-carboxy-2-methylcyclohexyl)methane, or 2,2-bis(4-carboxycyclohexyl)propane; bis(4-carboxycyclohexyl)ketone; bis(4-carboxycyclohexyl)sulfoxide; and 4,4'-dicarboxydicyclohexyl ether], a crosslinked cyclic alkanedicarboxylic acid (a di- or tricyclo$C_{7-10}$alkane-dicarboxylic acid such as bornanedicarboxylic acid, norbornanedicarboxylic acid, or adamantanedicarboxylic acid), a crosslinked cyclic alkenedicarboxylic acid (a di- or tricyclo$C_{7-10}$alkene-dicarboxylic acid such as bornenedicarboxylic acid or norbornenedicarboxylic acid), and others. Among these alicyclic dicarboxylic acids, a dicarboxylic acid containing a $C_{5-10}$cycloalkane, particularly a $C_{6-8}$cycloalkane-dicarboxylic acid or a bis($C_{6-8}$cycloalkyl)$C_{1-4}$alkane-dicarboxylic acid is preferred.

The dicarboxylic acid component may also include an aliphatic dicarboxylic acid or an aromatic dicarboxylic acid. As the aliphatic dicarboxylic acid, for example, there can be mentioned an alkanedicarboxylic acid having 4 to 20 carbon atoms (preferably a $C_{4-16}$alkanedicarboxylic acid, particularly a $C_{6-14}$alkanedicarboxylic acid) such as succinic acid, glutaric acid, adipic acid, pimeric acid, cork acid (suberic acid), azelaic acid, sebacic acid, or dodecanedioic acid. The aromatic dicarboxylic acid may include, for example, terephthalic acid, isophthalic acid, phthalic acid, and others. These dicarboxylic acid components can be used singly or in combination. Among these dicarboxylic acid components, the aliphatic dicarboxylic acid is preferred from the viewpoint of flexibility.

In the alicyclic polyamide-series resin, the proportion (or molar ratio) of an alicyclic monomer residue relative to other copolymerizable monomer residue is, [the alicyclic monomer residue/the copolymerizable monomer residue]=about 100/0 to 0.1/99.9, preferably about 90/10 to 0.5/99.5 (e.g., 70/30 to 1/99), and more preferably about 60/40 to 3/97 (particularly about 50/50 to 5/95). In terms of joinability, the proportion of the alicyclic monomer residue is preferred to be large, but in terms of flexibility, the proportion of the alicyclic monomer residue is preferred to be small. Therefore, it is preferred to select appropriate proportions of the alicyclic monomer residue depending on the purpose.

Moreover, the alicyclic monomer may be added only to terminal (end) group of the polymer. The method for addition may include for example a method which comprises blocking or capping a terminal group of an after-mentioned aliphatic or aromatic polyamide with a carboxyl group and adding an aliphatic diamine to the terminal carboxyl group(s), or a method which comprises polymerizing a lactam having about 4 to 20 carbon atoms (such as caprolactam or lauryllactam (dodecyllactam)) in the presence of a small amount of a dicarboxylic acid component, followed by adding an alicyclic diamine to the terminal carboxyl group(s), and others.

Among these alicyclic polyamide-series resins, as mentioned above, from the viewpoint of joinability and flexibility, it is preferred to use an alicyclic polyamide-series resin obtainable from an alicyclic diamine and an aliphatic dicarboxylic acid, for example, an alicyclic polyamide-series resin is particularly preferred which is obtained from a diamine containing an amino$C_{5-10}$cycloalkane [e.g., a $C_{6-8}$cycloalkanediamine such as diaminocyclohexane, a bis(amino$C_{6-8}$cycloalkyl)$C_{1-14}$alkane such as bis(4-aminocyclohexyl)methane, or bis(4-amino-2-methylcyclohexyl)methane], and an alkanedicarboxylic acid having about 4 to 20 carbon atoms (e.g., a $C_{6-14}$alkanedicarboxylic acid such as azelaic acid, sebacic acid, or dodecanedioic acid).

The alicyclic polyamide-series resins can be used singly or in combination. Among the alicyclic polyamide-series resins, a condensation product of the aliphatic dicarboxylic acid with the alicyclic diamine (a homo- or copolyamide) or others is preferred.

The number average molecular weight of the alicyclic polyamide-series resin is about 6,000 to 100,000, preferably about 8,000 to 50,000, and more preferably about 10,000 to 30,000. The molecular weight can be adjusted by using excessive amount of aliphatic diamine and/or alicyclic diamine than the calculated amount in the polymerization.

The alicyclic polyamide elastomer (alicyclic polyamide block copolymer) may include an alicyclic polyamide-polyether block copolymer [e.g., an alicyclic polyamide-polyether block copolymer which contains a polyether segment or block as a soft segment, such as a poly$C_{2-4}$alkylene oxide (e.g., a polytetramethylene oxide (PTMG), a polyethylene oxide, or a polypropyleneoxide)], and others. As the alicyclic polyamide block, a polyamide block (unit) constituting the alicyclic polyamide-series resin can be utilized. The alicyclic polyamide elastomer may be a copolyamide elastomer in which at least one member selected from the group consisting of an alicyclic polyamide block and a polyether block is combined with a block different in species. Moreover, the alicyclic polyamide block and the polyether block may be a copolyamide block and a copolyether block, respectively.

As the alicyclic polyamide-polyether block copolymer, there may be mentioned a block copolymer obtainable by copolycondensation of an alicyclic polyamide block having a reactive terminal group with a polyether block having a reactive terminal group, particularly, an alicyclic polyether amide (e.g., a block copolymer of an alicyclic polyamide block having dicarboxyl terminal groups with a polyoxyalkylene block having diamine terminal groups), a polyether ester amide (e.g., a block copolymer of an alicyclic polyamide block having dicarboxyl terminal groups with a polyoxyalkylene block having dihydroxy terminal groups, a block copolymer of an alicyclic polyamide block having diamine terminal groups with a polyoxyalkylene block having dicarboxyl terminal groups (e.g., a polyoxyalkylene block whose terminal groups are esterified with a dicarboxylic acid), and the like.

The proportion of the alicyclic monomer constituting the alicyclic polyamide elastomer can be selected from the same range with the alicyclic polyamide-series resin. These alicyclic polyamide elastomers can be used singly or in combination.

From the viewpoint of joinability, the alicyclic polyamide elastomer is preferably used in combination with the above-mentioned alicyclic polyamide-series resin. In the case of using the alicyclic polyamide-series resin in combination with the alicyclic polyamide elastomer, the proportion (weight ratio) of the above may be [the alicyclic polyamide-series resin/the alicyclic polyamide-series elastomer]=about 99/1 to 30/70, preferably about 97/3 to 50/50, and more preferably about 95/5 to 60/40.

The alicyclic polyamide component may be the alicyclic polyamide-series resin and the alicyclic polyamide elastomer, in addition an alicyclic polyamide oligomer. These alicyclic polyamide components can be used singly or in combination.

As the alicyclic polyamide oligomer, there may be used an alicyclic polyamide having a relatively low molecular weight, which may be obtained by a conventional manner, for example, by adjusting polycondensation or other conditions and using the above-mentioned alicyclic polyamide component(s). For example, as a polyamide component to be a raw material, there may be mentioned the combination of the above-mentioned diamine with the dicarboxylic acid, the combination of the above-mentioned diamine and/or dicarboxylic acid, with the lactam (e.g., a lactam having about 4 to 20 carbon atoms, such as ω-laurolactam), and other combinations. The alicyclic polyamide oligomer may be obtained by for example polymerizing the lactam and the alicyclic diamine with heating and stirring under an applied pressure.

The number average molecular weight of the alicyclic polyamide oligomer may be, for example, about 500 to 10,000, preferably about 1000 to 10,000 (e.g., about 2,000 to 9,000), and more preferably about 3,000 to 8,000 (e.g., about 3,000 to 6,000). Moreover, the joining property of the polyamide-series resin constituting the resin member to the thermoplastic polyurethane can be improved by using an alicyclic polyamide oligomer having a relatively high molecular weight. The above-mentioned number average molecular weight may be adjusted by using an excessive amount of aliphatic diamine and/or alicyclic diamine than the calculated amount in the polymerization.

Among these alicyclic polyamide components, in terms of joinability, the alicyclic polyamide-series resin or the alicyclic polyamide oligomer, particularly the alicyclic polyamide-series resin is preferred. Moreover, from the viewpoint of joinability, the polyamide component obtained by using an alicyclic diamine (e.g., a diamine containing an amino$C_{5-10}$cycloalkane) is preferred as the alicyclic polyamide component.

(b) Composition Comprising Alicyclic Polyamide Component and Non-Alicyclic Polyamide Component The polyamide component having an alicyclic ring may be a composition comprising an alicyclic polyamide component and a non-alicyclic polyamide component (or an alicyclic ring-free polyamide component).

As the non-alicyclic polyamide component, there may be mentioned an aliphatic polyamide-series resin or an aromatic polyamide-series resin, and various homopolyamides and copolyamides can be employed.

Among the aliphatic polyamide-series resins, the homopolyamide may include a condensation product of the aliphatic diamine component and the aliphatic dicarboxylic acid component, for example, a polyamide 46, a polyamide 66, a polyamide 610, a polyamide 612, and a polyamide 1010; a homopolyamide of a lactam [e.g., a lactam having about 4 to 20 (preferably about 4 to 16) carbon atoms, such as ε-caprolactam or ω-laurolactam] or an aminocarboxylic acid [e.g., an aminocarboxylic acid having about 4 to 20 (preferably about 4 to 16) carbon atoms, such as ω-aminoundecanoic acid], for example, a polyamide 6, a polyamide 11, and a polyamide 12; and others. Moreover, the copolyamide may include a copolyamide which can be obtained by copolymerization of a monomer component capable of constituting a polyamide, e.g., the aliphatic diamine components, the aliphatic dicarboxylic acid components, the lactams and the aminocarboxylic acids. Examples of the copolyamide may include a copolymer of 6-aminocaproic acid and 12-aminododecanoic acid; a copolymer of 6-aminocaproic acid, 12-aminododecanoic acid, hexamethylenediamine and adipic acid; a copolymer of hexamethylenediamine, adipic acid, hydrogenated dimer acid and 12-aminododecanoic acid; a polyamide 6/11, a polyamide 6/12, a polyamide 66/11, a polyamide 66/12; and others. These aliphatic polyamide-series resins can be used singly or in combination.

The aromatic polyamide-series resin may include a polyamide in which at least one component selected from the aliphatic diamine component and the aliphatic dicarboxylic acid component comprises an aromatic component, for example, a polyamide having an aromatic component in a diamine component [for example, a condensation product of an aromatic diamine (e.g., metaxylylenediamine) and an aliphatic dicarboxylic acid, such as MXD-6], a polyamide having an aromatic component in a dicarboxylic acid component [e.g., a condensation product of an aliphatic diamine (e.g., trimethylhexamethylenediamine) and an aromatic dicarboxylic acid (e.g., terephthalic acid, isophthalic acid)], and others. These aromatic polyamide-series resins can be used singly or in combination.

Incidentally, in the non-alicyclic polyamide component, a polyamide in which both a diamine component and a dicarboxylic acid component comprise an aromatic component [for example, a perfect aromatic amide such as a poly(m-phenyleneisophthalamide) (e.g., Aramid)] may be used in combination.

The non-alicyclic polyamide component may further include a polyamide comprising a dimer acid as a dicarboxylic acid component, a polyamide in which a branched chain structure is introduced by using a small amount of a polyfunctional polyamine and/or polycarboxylic acid component, a modified polyamide (e.g., a N-alkoxymethylpolyamide), an aliphatic or aromatic polyamide block copolymer, and others.

These non-alicyclic polyamide components can be used singly or in combination. Among these components, in terms of flexibility, the aliphatic polyamide-series resin or the aliphatic polyamide block copolymer, particularly the aliphatic polyamide-series resin can be preferably employed.

The proportion (weight ratio) of the alicyclic polyamide component relative to the non-alicyclic polyamide component may be, depending on the proportion of the alicyclic ring in the alicyclic polyamide component, selected from the range of the former/the latter=about 99/1 to 1/99, and in terms of joinability, the proportion may be, for example, about the former/the latter=about 98/2 to 30/70, preferably about 97/3 to 50/50, and more preferably about 95/5 to 70/30. Moreover, in the case where the alicyclic polyamide component comprises an alicyclic polyamide oligomer, even a small proportion thereof ensures sufficient joinability. Accordingly, from the viewpoint of flexibility or others, the proportion of the alicyclic polyamide component relative to the non-alicyclic polyamide component may be, for example, the former/the latter=about 50/50 to 0.1/99.9, preferably about 40/60 to 3/97, and more preferably about 30/70 to 5/95 (particularly about 20/80 to 5/95).

In these polyamide components having an alicyclic ring, in terms of joinability, is preferred a component containing an alicyclic polyamide-series resin, particularly (i) an alicyclic polyamide-series resin (ii) a combination of an alicyclic polyamide-series resin with an alicyclic polyamide elastomer, or (iii) a combination of an alicyclic polyamide-series resin with an aliphatic polyamide-series resin.

In the present invention, the polyamide component having an alicyclic ring may have an amino group at a specific concentration. The amino group usually shows a free amino group ($—NH_2$ group) and usually does not include a $—NH—$ (imino) group and $—N<$ group derived from an amide bond constituting the main chain of the polyamide-series resin, a urea bond, a urethane bond and other bond. The polyamide-series resin may have the free amino group in a branched chain thereof, or at the end of a main chain thereof.

The content (or concentration) of the amino group (or amino group concentration) in the polyamide-series resin having an alicyclic ring is, relative to 1 kg of the non-urethane-series thermoplastic resin (polyamide-series resin), not less than 10 mmol (e.g., about 10 to 300 mmol), preferably not less than 15 mmol (e.g., about 15 to 200 mmol), more preferably not less than 20 mmol (e.g., about 20 to 150 mmol), and particularly not less than 30 mmol (e.g., about 30 to 100 mmol).

The polyamide-series resin may preferably contain an amino group in the above range, particularly contain a terminal amino group in the above range. The amino group may be an alicyclic amino group in which a part of or all terminal amino groups is (are) an alicyclic amino group (e.g., an amino group which is directly bonded to an alicyclic group, such as a cycloalkylamino group). Moreover, in order to adjust the content (concentration) of amino groups, in addition to an amine compound [e.g., a diamine (e.g., the above exemplified aliphatic diamines, the alicyclic diamines and the aromatic diamines), a polyamine such as an aliphatic polyamine (for example, a polyalkylenepolyamine (e.g., a $polyC_{2-3}$alkylenepolyamine) such as diethylenetriamine or triethylenetetramine)] or others may be added.

In the present invention, it is particularly preferred to use the alicyclic diamine for converting the amino group into an alicyclic amino group (e.g., a cycloalkylamino group) derived from the alicyclic diamine. Usage of the polyamide component having the alicyclic amino group derived from an alicyclic diamine improves joinability (or bonding strength) of the non-urethane-series thermoplastic resin (polyamide-series resin) to the thermoplastic polyurethane-series resin member.

Incidentally, the concentration of the carboxyl group in the polyamide component having an alicyclic ring is not particularly limited to a specific one, and for example about 0.1 to 200 mmol/kg, preferably about 0.5 to 150 mmol/kg, and more preferably about 1 to 100 mmol/kg.

In the present invention, the proportion (molar ratio) of the alicyclic monomer residue relative to the other monomer residue in all polyamide components constituting the non-urethane-series resin (polyamide-series resin) is the former/the latter=about 100/0 to 0.1/99.9, preferably about 90/10 to 0.5/99.5, and more preferably about 70/30 to 1/99.

(Ib-2) Non-Urethane-Series Thermoplastic Resin (Resin Composition)

The resin composition (Ib-2) constituting the above molded composite article (Ia-2) contains a base resin (non-urethane-series thermoplastic resin) and an amino group-containing compound, and is suitable for forming or shaping a molded composite article (composite molded article) by joining or bonding to a thermoplastic urethane-series resin.

(Base Resin)

As the non-urethane-series thermoplastic resin being a base resin of the non-urethane-series thermoplastic resin composition (Ib-2), for example, there may be exemplified that a polyamide-series resin, a polyester-series resin, a polycarbonate-series resin, a polyphenylene sulfide-series resin, a polysulfone-series resin [e.g., a polysulfone, a poly(ether sulfone), and a poly(4,4'-bisphenolether sulfone)], a thermoplastic polyimide-series resin, a polyether ketone-series resin [e.g., a polyether ketone, a poly(ether-ether ketone)], an olefinic resin, a styrenic resin, a (meth)acrylic resin, a halogen-containing vinyl-series resin, and others. These non-urethane-series thermoplastic resins can be used singly or in combination.

(a) Polyamide-Series Resin

As the polyamide-series resin, there may be mentioned an aliphatic polyamide-series resin, an alicyclic polyamide-series resin, an aromatic polyamide-series resin, or others, and various homopolyamides and copolyamides may be used.

Among the aliphatic polyamide-series resins, the homopolyamide may include the aliphatic polyamides which are exemplified in the item of the non-urethane-series thermoplastic resin (Ib-1), that is, a condensation product of an aliphatic diamine component [e.g., a $C_{4-16}$alkylenediamine such as tetramethylenediamine, hexamethylenediamine, or dodecanediamine (preferably a $C_{4-14}$alkylenediamine, particularly a $C_{6-12}$alkylenediamine)] and an aliphatic dicarboxylic acid component [e.g., an alkanedicarboxylic acid having about 4 to 20 carbon atoms, such as adipic acid, sebacic acid, or dodecanedioic acid (preferably a $C_{4-16}$alkanedicarboxylic acid, and particularly a $C_{6-14}$alkanedicarboxylic acid)].

The alicyclic polyamide-series resin may include the alicyclic polyamides which are exemplified in the item of the non-urethane-series thermoplastic resin (Ib-1), that is, a homopolyamide or copolyamide having at least one component selected from the group consisting of at least an alicyclic diamine and an alicyclic dicarboxylic acid as a constitutive component. As such an alicyclic polyamide-series resin, for example, there may be used an alicyclic polyamide obtained by using an alicyclic diamine and/or an alicyclic dicarboxylic acid as at least one component among a diamine component and a dicarboxylic acid component each constituting a polyamide-series resin. As the diamine component and the dicarboxylic acid component, the above-mentioned aliphatic diamine(s) and/or aliphatic dicarboxylic acid(s) are preferably used in combination with the alicyclic diamine(s) and/or alicyclic dicarboxylic acid(s) (a so-called transparent polyamide).

Examples of the alicyclic diamine may include the alicyclic diamines which are exemplified in the above item of non-urethane-series thermoplastic resin (Ib-1), that is, a diaminocycloalkane such as diaminocyclohexane (e.g., a diamino$C_{5-10}$cycloalkane); a bis(aminocycloalkyl)alkane such as bis(4-aminocyclohexyl)methane, bis(4-amino-3-methylcyclohexyl)methane, or 2,2-bis(4'-aminocyclohexyl)propane [e.g., a bis(amino$C_{5-8}$cycloalkyl)$C_{1-3}$alkane]; and others. Moreover, the alicyclic dicarboxylic acid may include a cycloalkanedicarboxylic acid such as cyclohexane-1,4-dicarboxylic acid or cyclohexane-1,3-dicarboxylic acid (for example, a $C_{5-10}$cycloalkane-dicarboxylic acid), and others.

Among the alicyclic polyamide-series resins, for example, a condensation product (a homo- or copolyamide) of the aliphatic dicarboxylic acid and the alicyclic diamine is preferred.

As the aromatic polyamide-series resin, there can be used the aromatic polyamide-series resins which are exemplified in the above item of the non-urethane-series thermoplastic resin (Ib-1), for example, a condensation product of an aromatic diamine (e.g., methaxylylenediamine) with an aliphatic dicarboxylic acid, such as MXD-6; a condensation product of an aliphatic diamine (e.g., trimethylhexamethylenediamine) with an aromatic dicarboxylic acid (e.g., terephthalic acid, isophthalic acid); and others.

Incidentally, in the polyamide-series resin, a polyamide in which both a diamine component and a dicarboxylic acid component comprise an aromatic component [for example, a perfect aromatic amide such as a poly(m-phenyleneisophthalamide) (e.g., Aramid)] may be used in combination.

The polyamide-series resin may further include a polyamide comprising a dimer acid as a dicarboxylic acid component, a polyamide in which a branched chain structure is introduced by using a small amount of a polyfunctional polyamine and/or polycarboxylic acid component, a modified polyamide (e.g., a N-alkoxymethylpolyamide), a polyamide block copolymer, and a composition thereof, and others.

Examples of the polyamide block copolymer may include polyamide elastomers containing a polyether segment, which are exemplified below, for example, a polyamide elastomer such as a polyamide-polyether block copolymer (e.g., a polyamide-polyether block copolymer containing a polyether segment or block such as a polytetramethylene glycol, a polyethylene glycol, or a polypropylene glycol as a soft segment). The polyamide-polyether block copolymer may include a block copolymer obtained by copolycondensation of a polyamide block having a reactive terminal group and a polyether block having a reactive terminal (terminal group), particularly, a polyether amide (e.g., a block copolymer of a polyamide block having diamine terminals with a polyoxyalkylene block having dicarboxyl terminals, a block copolymer of a polyamide block having dicarboxyl terminals with a polyoxyalkylene block having diamine terminals), a polyether ester amide (e.g., a block copolymer of a polyamide block having dicarboxyl terminals with a polyoxyalkylene block having dihydroxy terminals), and others. Incidentally, commercially available polyamide elastomers usually scarcely have amino groups in many cases.

The polyamide-series resin may be used singly or in combination. Moreover, the polyamide-series resin may be a blend or alloy of a plurality of polyamide-series resins.

The preferred polyamide-series resin includes an aliphatic polyamide-series resin, an alicyclic polyamide-series resin (particularly, a transparent polyamide), and others. The polyamide-series resin may be used in combination with an aromatic polyamide-series resin in combination. Furthermore, the polyamide block copolymer is also preferred.

The number average molecular weight of the polyamide-series resin is about 6,000 to 100,000, preferably about 8,000 to 50,000, and more preferably about 10,000 to 30,000.

Incidentally, in the case where a polyamide-series resin is used as the base resin, in order to enhance joinability of a non-urethane-series thermoplastic resin member (e.g., a hard resin member) with a thermoplastic polyurethane-series resin member (e.g., a soft resin member), the enthalpies of fusion and crystallization of the polyamide-series resin may be not more than 100 J/g (e.g., about 0 to 100 J/g), preferably not more than 80 J/g (e.g., about 0 to 80 J/g), and more preferably not more than 70 J/g (e.g., about 0 to 70 J/g). According to the present invention, even using a polyamide-series resin having a low degree of crystallinity, certain and efficient joining can be ensured. The enthalpies of fusion and crystallization in such a polyamide-series resin may for example be selected from a range of not more than 30 J/g (e.g., about 0 to 30 J/g), preferably not more than 20 J/g (e.g., about 0 to 20 J/g), and more preferably not more than 17 J/g (about 0 to 17 J/g).

The "enthalpies of fusion and crystallization" of the polyamide-series resin means a value obtained by subtracting a heat of crystallization ($\Delta Hf$) generated along with crystallization of a resin from a heat of fusion ($\Delta Hm$) necessary to melt the resin. That is, in a measurement of the heat of fusion, if both the heat of crystallization and the following heat of fusion are observed along with raising the temperature, the enthalpies of fusion and crystallization of the polyamide-series resin is assessed as a value subtracted the found value ΔHf of the heat of crystallization per one gram of the resin from the found value ΔHm of the heat of fusion per one gram of the resin. The enthalpies of fusion and crystallization can be measured by a differential scanning calorimeter (DSC apparatus) based on JIS (Japanese Industrial Standards) K 7122. Incidentally, since the heat of crystallization cannot be observed in a perfect amorphous polyamide, the enthalpies of fusion and crystallization of such a polyamide is qualified as 0 J/g.

The polyamide-series resin having such enthalpies of fusion and crystallization, in particular a polyamide-series resin having enthalpies of fusion and crystallization of not more than 20 J/g (e.g., a transparent polyamide) may be molded by a known molding method. The further details about of such a polyamide-series resin may for example be referred to Japanese Patent Application Laid-Open No. 239469/1996 (JP-8-239469A), Japanese Patent Application Laid-Open No. 1544/2000 (JP-2000-1544A), and others.

Incidentally, the concentration of the carboxyl group (or carboxyl group concentration) in the polyamide-series resin is not particularly limited to a specific one, and may for example be about 0.1 to 200 mmol/kg, preferably about 0.5 to 150 mmol/kg, and more preferably about 1 to 100 mmol/kg.

(b) Polyester-Series Resin

The polyester-series resin may include a polyalkylene arylate (e.g., a $C_{2-4}$alkylene terephthalate such as a polyethylene terephthalate or a polybutylene terephthalate, and a $C_{2-4}$alkylene naphthalate such as a polyethylene naphthalate, or the copolyester thereof [e.g., a copolyester which comprises a diol component (e.g., a (poly)oxy$C_{2-4}$alkylene glycol such as ethylene glycol, or a polyethylene glycol; an aliphatic $C_{5-16}$diol such as 1,6-hexanediol; an alicyclic diol such as 1,4-cyclohexane dimethanol), and a dicarboxylic acid component (e.g., an aliphatic dicarboxylic acid such as adipic acid or sebacic acid; and an aromatic dicarboxylic acid such as isophthalic acid) as a copolymerizable component], a polyester-series elastomer [e.g., a polyester-polyether-based polyester elastomer which comprises a poly$C_{2-4}$alkylene arylate such as a polyethylene terephthalate or a polybutylene terephthalate as a hard segment, a polyoxy$C_{2-4}$alkylene glycol such as a polytetramethylene glycol as a soft segment; and a polyester-polyester-based polyester elastomer which comprises the poly$C_{2-4}$alkylene arylate as a hard segment and a polyaliphatic ester such as a poly(ε-caprolactone) or a polybutylene adipate as a soft segment], and others.

(c) Polycarbonate-Series Resin

The polycarbonate-series resin may include a polymer obtained by reaction of a dihydroxy compound [e.g., an alicyclic diol or a bisphenol compound (e.g., a bis(hydroxyaryl) alkane (preferably a bis(hydroxy$C_{6-10}$aryl)$C_{1-6}$alkane) such as bis(4-hydroxyphenyl)methane or bisphenol A); in addition, a bis(hydroxy$C_{6-10}$aryl)ether such as 4,4'-dihydroxydiphenylether; a bis(hydroxy$C_{6-10}$aryl)sulfone such as 4,4'-dihydroxydiphenylsulfone; a bis(hydroxy$C_{6-10}$aryl)sulfide such as 4,4'-dihydroxydiphenylsulfide; a bis(hydroxy$C_{6-10}$aryl)ketone such as 4,4'-dihydroxydiphenylketone] with phosgene or a carbonic acid ester (e.g., a diaryl carbonate such as diphenyl carbonate, and a dialkyl carbonate such as dimethyl carbonate), and others.

(d) Polyphenylene Sulfide-Series Resin

The polyphenylene sulfide-series resin includes a linear or crosslinked polyphenylene sulfide, for example, a polyphenylene sulfide (such as a poly-1,4-phenylene sulfide), a polybiphenylene sulfide (PBPS), a polyphenylene sulfide ketone (PPSK), and others.

(e) Olefinic Resin

The olefinic resin (or polyolefinic resin) may include a homo- or copolymer of a $C_{2-10}$olefine (e.g., a polyethylene, a polypropylene, a poly(1-butene), and an ethylene-propylene copolymer), a copolymer of an olefin with a copolymerizable monomer (e.g., an ethylene-vinyl acetate copolymer, an ethylene-(meth)acrylate copolymer), a modified polyolefin], a polyolefinic elastomer (an elastomer containing a hard segment comprising a polyolefin (such as a polyethylene or a polypropylene) and a soft segment comprising a rubber component (such as an ethylene-propylene rubber (EPR) or an ethylene-propylene-diene rubber (EPDM)), and others.

(f) Styrenic Resin

The styrenic resin may include a polystyrene (GPPS), a high impact polystyrene (HIPS), an acrylonitrile-styrene copolymer (AS resin), an acrylonitrile-butadiene-styrene block copolymer (ABS resin), a polystyrenic elastomer (e.g., a styrene-butadiene-styrene (SBS) block copolymer, a styrene isoprene-styrene (SIS) block copolymer) and others.

(g) (Meth)Acrylic Resin

The (meth)acrylic resin may include a homo- or copolymer of a (meth)acrylic acid or an ester thereof [e.g., a poly(methyl methacrylate)], a copolymer of (meth)acrylic acid or an ester thereof with other copolymerizable monomer [e.g., a (meth) acrylic acid-styrene copolymer, and a methyl methacrylate-styrene copolymer], and others.

(h) Halogen-Containing Vinyl-Series Resin

The halogen-containing vinyl-series resin may include a chlorine-containing vinyl-series resin such as a poly(vinyl chloride), a vinyl chloride-vinyl acetate copolymer, a fluorine-containing vinyl-series resin, a poly(vinyl chloride)-series elastomer, a fluorine-series thermoplastic elastomer, and others.

The non-urethane-series thermoplastic resin can be used singly or in combination. Among the non-urethane-series thermoplastic resins, a polyamide-series resin, a polyester-series resin, a polycarbonate-series resin, a polyphenylene sulfide-series resin, a polystyrenic resin, polyolefinic resin and others are preferred. Moreover, as the non-urethane-series thermoplastic resin, a thermoplastic elastomer (e.g., a polyamide-series elastomer, a polyester-series elastomer, a polyolefinic elastomer, a polystyrenic elastomer, a poly(vinyl chloride)-series elastomer, and a fluorine-containing thermoplastic elastomer) may be employed.

The base resin may have or substantially may not have an amino group. In the case where the base resin has an amino group, the base resin may have an amino group in a side chain of the resin or at the end of a main chain thereof. Incidentally, the amino group usually means a free amino group (—$NH_2$ group), and usually does not include an amide bond included in a main chain of the base resin (e.g., a polyamide-series resin), a urea bond, a —NH— (imino) group and a —N< group derived from a urethane bond.

The content (or concentration) of amino group in the base resin may be small, for example, about 0 to 20 mmol/kg, preferably about 0 to 10 mmol/kg, and more preferably about 0 to 8 mmol/kg.

(Amino Group-Containing Compound)

As the amino group-containing compound, there may be used various amino group-containing compounds which are mixable with the base resin, such as a polyamine [e.g., a diamine (for example, the above-mentioned aliphatic diamines (e.g., a $C_{4-16}$alkylenediamine such as hexamethylenediamine), an alicyclic diamine and an aromatic diamine);

in addition a polyoxyalkylenediamine (e.g., a polyoxyC$_{2-4}$alkylenediamine) such as a polyoxyethylenediamine); and a polyamine, for example, an aliphatic polyamine such as a polyalkylenepolyamine such as diethylenetriamine, or triethylenetetramine (e.g., a polyC$_{2-3}$alkylenepolyamine)], a monoamine, and a polyamide oligomer.

As the polyamide oligomer, there may be used a polyamide having a relatively low molecular weight, which is obtained by a conventional manner, for example, by adjusting polycondensation or other conditions and using the above-mentioned polyamide component(s). For example, as a polyamide component to be a raw material, there may be mentioned the combination of the above-mentioned diamine [e.g., an aliphatic diamine (e.g., an alkylenediamine), an alicyclic diamine, and an aromatic diamine] and a dicarboxylic acid (e.g., an aliphatic dicarboxylic acid, and an aromatic dicarboxylic acid), the combination of the above-mentioned diamine and/or dicarboxylic acid and the lactam (e.g., a lactam having about 4 to 20 carbon atoms, such as ω-laurolactam), and other combinations. The polyamide oligomer may be obtained by for example polymerizing the lactam and the aliphatic diamine with heating and stirring under an applied pressure.

The number average molecular weight of the polyamide oligomer is, for example, about 500 to 10,000, preferably about 500 to 8,000 (e.g., about 1,000 to 7,000), more preferably about 1,000 to 5,000, and usually about 2,000 to 6,000 (e.g., about 3,000 to 6,000). As the polyamide oligomer, for example, the number average molecular weight may be about 1000 to 10,000, preferably about 2,000 to 9,000, and more preferably about 3,000 to 8,000. Use of such a polyamide oligomer improves the joinability (or joining property) of the polyamide-series resin constituting the resin member to the thermoplastic polyurethane.

The polyamide oligomer may usually have a free amino group at least at one terminal of the main chain, may have free amino groups at both terminals of the main chain, or may have a free amino group at a side chain. The amino group-containing compound can be used singly or in combination.

The amino group-containing compound may be a monoamine, and is usually preferred to be a compound having not less than two amino groups (e.g., primary amino group) in a molecule, particularly, to be a polyamide oligomer in terms of joinability.

The amino group concentration of the amino group-containing compound may for example be about 40 to 1000 mmol/kg, preferably about 50 to 700 mmol/kg, and more preferably about 100 to 500 mmol/kg. In particular, the amino group-containing compound preferably has a terminal amino group in the above range.

The proportion of the amino group-containing compound, relative to 100 parts by weight of the base resin, can for example be selected from the range of about 0.01 to 20 parts by weight, and may be preferably not more than 10 parts by weight (about 0.01 to 10 parts by weight), more preferably about 0.1 to 8 parts by weight, and particularly not more than 7 parts by weight (about 0.5 to 7 parts by weight). Incidentally, excess amount of the amino group-containing compound may deteriorate the resin property, particularly in the case of using a non-urethane-series thermoplastic resin composition as a hard resin.

Since the non-urethane-series thermoplastic resin composition (Ib-2) usually contains an amino group (usually, an amino group derived from the amino group-containing compound), even if the base resin is a non-urethane-series thermoplastic resin, the non-urethane-series thermoplastic resin composition can directly and firmly join or bond with a thermoplastic polyurethane-series resin or resin member. The proportion (or concentration) of amino group in the resin composition may for example be not less than 10 mmol (e.g., about 10 to 300 mmol), preferably not less than 15 mmol (e.g., about 15 to 200 mmol), about not less than 20 mmol (e.g., about 20 to 150 mmol), and particularly not less than 30 mmol (e.g., about 30 to 100 mmol) in 1 kg of the resin composition. In particular, the resin composition preferably has a terminal amino group in such a range. Incidentally, the amino group concentration in the resin composition is suitably adjustable with the amino group concentration in the non-urethane-series thermoplastic resin or the amino group-containing compound, or the proportion of these components.

(IIb) Non-Urethane-Series Thermoplastic Resin having a Polyether Segment

The non-urethane-series thermoplastic resin (IIb) constituting the above molded composite article (IIa) has a polyether segment, and usually is a polyamide-series resin having a polyether segment.

The non-urethane-series thermoplastic resin (polyamide-series resin) comprises a polyamide-series resin having at least a polyether segment [e.g., a polytetramethylene glycol (PTMG, polytetramethylene ether) segment or unit, a polyoxyC$_{2-4}$alkylene segment or unit such as a polyethylene glycol or a polypropylene glycol]. At least one member selected from the group consisting of a polyamide-series resin and a thermoplastic polyurethane-series resin (particularly a polyamide-series resin) may have at least a PTMG unit.

Such a polyamide-series resin may include a polyamide obtained by using a component having a polyether segment [e.g., a diamine having a polyoxyC$_{2-4}$alkylene unit, a dicarboxylic acid and an aminocarboxylic acid] as at least a part of components among the constitution component of the polyamide (e.g., a diamine, a dicarboxylic acid, and an aminocarboxylic acid). Moreover, the polyamide-series resin having the polyether segment may include a polyamide block copolymer (that is, a polyamide elastomer having a polyether component as a soft segment) obtained by reaction of a polyamide component (polyamide block or segment) having a reactive terminal group with a polyether component (polyether block or segment) having a terminal group reactive to the above reactive terminal group of the polyamide component.

Such a polyamide elastomer may also include for example a polyamide obtained by reaction of a polyamide component having a terminal carboxyl group with a polyether component having a terminal amino group, a polyamide obtained by reaction of a polyamide component having a terminal amino group with a polyether component having a terminal carboxyl group, a polyamide obtained by reaction of a polyamide component having a terminal carboxyl group with a polyether component having a terminal hydroxyl group, and others.

As the polyether component having a reactive terminal group, there can be utilized a component having a terminal amino group [e.g., a polyoxyC$_{2-4}$alkylenediamine (such as polyoxyethylenediamine)], a component having a terminal carboxyl group (e.g., a half ester of a dicarboxylic acid(s) with a polyoxyC$_{2-4}$alkylene glycol), a component having a terminal hydroxyl group, for example, a polyoxyC$_{2-4}$alkylene glycol [e.g., a polyethylene glycol, a polypropylene glycol, a polytetramethylene ether glycol, a block copolymer of these polyoxyalkylene glycols (such as a polyoxyethylene-polyoxypropylene block copolymer); and an alkyleneoxide adduct of an aromatic diol (e.g., a bisphenol A-C$_{2-4}$alkyleneoxide adduct)].

The above polyamide component having a reactive terminal group includes an aliphatic polyamide, an alicyclic polyamide, an aromatic polyamide, and others, and various homopolyamides and copolyamides can be used.

Among the aliphatic polyamide, the homopolyamide may include the homopolyamides exemplified in the item of the non-urethane-series thermoplastic resin (Ib-1), namely, a condensation product of an aliphatic diamine component (for example, a $C_{4-12}$alkylenediamine (e.g., a $C_{6-12}$alkylenediamine) such as tetramethylenediamine, hexamethylenediamine, or dodecanediamine) with an aliphatic dicarboxylic acid component (e.g., a $C_{6-14}$alkylenedicarboxylic acid such as adipic acid, sebacic acid, or dodecanedioic acid), and others.

The alicyclic polyamide may include a homopolyamide or copolyamide having at least one component selected from the group consisting of at least an alicyclic diamine and an alicyclic dicarboxylic acid (e.g., a $C_{5-10}$cycloalkane-dicarboxylic acid such as cyclohexane-1,4-dicarboxylic acid or cyclohexane-1,3-dicarboxylic acid) as a constitutive component. For example, there may be used an alicyclic polyamide obtained by using an alicyclic diamine and/or an alicyclic dicarboxylic acid as at least one component among a diamine component and a dicarboxylic acid component each constituting a polyamide-series resin. As the diamine component and the dicarboxylic acid component, the above-mentioned aliphatic diamine(s) and/or aliphatic dicarboxylic acid(s) are preferably used in combination with the alicyclic diamine(s) and/or alicyclic dicarboxylic acid(s) (a so-called transparent polyamide). Among the alicyclic polyamides, a condensation product (a homo- or copolyamide) of the aliphatic dicarboxylic acid with the alicyclic diamine is preferred.

Examples of the alicyclic diamine may include a diamino$C_{5-10}$cycloalkane such as diaminocyclohexane; a bis(amino$C_{5-8}$cycloalkyl)$C_{1-3}$alkane such as bis(4-aminocyclohexyl)methane, bis(4-amino-3-methylcyclohexyl)methane, or 2,2-bis(4-aminocyclohexyl)propane; and others.

The aromatic polyamide may include the aromatic polyamides exemplified in the item of the non-urethane-series thermoplastic resin (Ib-1), for example, a condensation product of an aromatic diamine (e.g., methaxylylenediamine) such as MXD-6 with an aliphatic dicarboxylic acid, a condensation product of an aliphatic diamine (e.g., trimethylhexamethylenediamine) with an aromatic dicarboxylic acid (e.g., terephthalic acid, isophthalic acid), and others.

As the polyamide component, there may be used a polyamide having a dimer acid as a dicarboxylic acid component, a polyamide to which a branched chain structure is introduced by using a small amount of a polyfunctional polyamine and/or polycarboxylic acid component, a modified polyamide (such as an N-alkoxymethylpolyamide), and others.

Incidentally, as the polyamide component, there may be used a perfect (fully) aromatic polyamide (e.g., Aramid) (a polyamide in which both a diamine component and a dicarboxylic acid component comprise an aromatic component) such as a poly(m-phenyleneisophthalamide) together with the aliphatic, alicyclic and/or aromatic polyamide.

These polyamide components can be used singly or in combination. The preferred polyamide includes at least an aliphatic polyamide.

The polyamide-series resin having the polyether segment may be used singly or in combination.

The number average molecular weight of the polyamide-series resin having a polyether segment is about 6,000 to 100,000, preferably about 8,000 to 50,000, and more preferably about 10,000 to 30,000.

The proportion of the polyether segment in the non-urethane-series thermoplastic resin (a polyamide-series resin) constituting the resin member may for example be about 10 to 90% by weight, preferably about 20 to 90% by weight, and more preferably about 30 to 90% by weight, relative to the whole resin. Moreover, in the polyamide elastomer, the proportion (weight ratio) of the polyamide segment relative to the polyether segment (e.g., a PTMG segment) is not particularly limited to a specific one, and for example, may be the former/the latter=about 9/1 to 2/8, preferably about 9/1 to 2.5/7.5, more preferably about 8/2 to 3/7, and particularly about 7/3 to 4/6.

Moreover, the proportion (weight ratio) of the polyether segment in the non-urethane-series thermoplastic resin (e.g., polyamide-series resin) constituting the resin member, relative to the polyether segment in the thermoplastic polyurethane-series resin constituting the resin member, may be for example about 1/10 to 10/1, preferably about 1/8 to 8/1, and more preferably about 1/5 to 5/1.

The polyamide-series resin having a polyether segment may have a terminal amino group (a free amino group, —NH$_2$), or may have a terminal carboxyl group. The commercially available polyamide elastomer having a polyether segment usually scarcely has an amino group. Incidentally, the carboxyl group concentration in the polyamide-series resin having a polyether segment is not particularly limited to a specific one, and for example, may be about 0.1 to 200 mmol/kg, preferably about 0.5 to 150 mmol/kg, and more preferably about 1 to 100 mmol/kg.

For instance, since the commercially available polyamide elastomer usually scarcely has an amino group, such a polyamide elastomer sometimes insufficiently improves joinability thereof with the thermoplastic polyurethane-series resin. In such a case, joinability between resin members may be enhanced by involving an amino group- and/or imino group-containing component in at least one of a polyamide-series resin and a thermoplastic polyurethane-series resin each constituting the resin members. Examples of the amino group- and/or imino group-containing component may include another polyamide-series resin (a polyamide-series resin having a terminal amino group, for example, a conventional polyamide-series resin such as the above exemplified aliphatic, alicyclic or aromatic polyamides), an amino group-containing compound (e.g., an amino group-containing compound having a high amino group concentration and a relatively low molecular weight, such as an amino group-containing polyamide oligomer), and others.

As the amino group-containing compound, there can be used various amine compounds mixable with a polyamide-series resin having a polyether segment, for example, the same compound with the amino group-containing compounds exemplified in the item of the resin composition (Ib-2). The amine compound can be used singly or in combination. Among these compounds, in terms of joinability, particularly a polyamide oligomer is preferred. Incidentally, the amino group concentration in the amino group-containing compound can be selected from the above-exemplified range, and may be, for example, about 10 to 1000 mmol/kg (preferably about 30 to 700 mmol/kg, particularly about 50 to 500 mmol/kg).

The proportion of the amino group-containing compound relative to the base resin (a polyamide-series resin having a polyether segment) can be also selected from the range exemplified in the item of the above resin composition (Ib-2).

In the above resin (IIb), the amino group concentration in the non-urethane-series thermoplastic resin (or resin composition) constituting the resin member is not particularly limited, and may be, for example, about 0 to 100 mmol/kg, preferably about 0 to 50 mmol/kg, and more preferably about 0 to 30 mmol/kg.

Incidentally, in the present invention, in the case of producing a molded composite article by joining a non-urethane-series thermoplastic resin with a thermoplastic polyurethane-series resin, a "warp" in the product sometimes occurs in association with joining due to the difference between mold shrinkage factors of the resin members. In particular, in the case where the degree of the correction for the warp is large, there is a possibility that breaking of the joining part or generation of stress crack in each resin member occurs. Therefore, the non-urethane-series thermoplastic resin preferably has lower crystallinity.

For example, in the polyamide-series resin, the final crystallinity degree (mean final crystallinity degree) is advantageously not more than 50% (e.g., about 5 to 50%), preferably not more than 40% (e.g., about 5 to 40%), and more preferably not more than 30% (e.g., about 10 to 30%).

In the case where a polyamide homopolymer is taken as an example and the final crystallinity degree is compared, the final crystallinity degree becomes smaller in the following order:

polyamide 66>polyamide 6≧polyamide 612>polyamide 11≧polyamide 12

Incidentally, considering only the final crystallinity degree, the copolymer is more advantageous than the homopolymer. Further, in general the copolymer is also more advantageous than the homopolymer from the perspective that the copolymer is superior to the homopolymer in flexibility.

In the case of a polyamide block copolymer (a polyamide elastomer) which comprises a polyamide homopolymer as a hard segment and a polyether as a soft segment, the final crystallinity degree can be adjusted by the ratio of the hard segment and the soft segment. When the final crystallinity degree of the polyamide block copolymer is adjusted to not more than 40% (e.g., about 5 to 40%), preferably not more than 35% (e.g., about 5 to 35%) and more preferably not more than 30% (e.g., about 10 to 30%), such a copolymer is advantageously used in combination with a thermoplastic polyurethane-series resin member for inhibiting warp generation, and further can provide a flexibility which suits with that of a thermoplastic polyurethane-series resin.

Incidentally, the term "the final crystallinity degree" means a degree of crystallinity measured by an X-ray diffraction analysis using a flat plate 1 mm thick, where the flat plate is formed by heating a sample resin to a temperature which is 20° C. higher than a melting point thereof, and then cooling the resin to a room temperature at a rate of 3° C./minute by means of a precision (or accurate) heat pressing machine. The melting point of the resin is measured by a differential scanning calorimeter (DSC apparatus) in accordance with JIS K 7122.

In such a range that the effects of the present invention are not deteriorated, the non-urethane-series thermoplastic resin member may contain other resins, and various additives, for example, a filler or reinforcing agent (e.g., a reinforcing fiber), a stabilizer (e.g., a ultraviolet ray absorbing agent, an antioxidant, and a heat stabilizer), a coloring agent, a plasticizer, a lubricant, a flame retardant, an antistatic agent, and others. In the case where the non-urethane-series thermoplastic resin is a polyamide-series resin (including the alicyclic polyamide, or the polyamide-series resin having a polyether segment), the other resin may include thermoplastic resins (such as a polyester-series resin, a polycarbonate-series resin, a polysulfone-series resin, a polyimide-series resin, a polyketone-series resin, a polyolefinic resin, a styrenic resin, a (meth)acrylic resin, and a halogen-containing vinyl-series resin) and others.

(Thermoplastic polyurethane-series resin) The thermoplastic polyurethane-series resin joinable with the non-urethane-series thermoplastic resin may be obtained by reacting a diisocyanate, a diol and, if necessary, a chain-extension agent.

The diisocyanate may include an aliphatic diisocyanate such as hexamethylene diisocyanate (HMDI), or 2,2,4-trimethylhexamethylene diisocyanate; an alicyclic diisocyanate such as 1,4-cyclohexane diisocyanate, dicyclohexylmethane-4,4'-diisocyanate, or isophorone diisocyanate (IPDI); an aromatic diisocyanate such as phenylene diisocyanate, tolylene diisocyanate (TDI), or diphenylmethane-4,4'-diisocyanate (MDI); an araliphatic diisocyanate such as xylylene diisocyanate; and others. As the diisocyanate, there may also be used a compound having an alkyl group (e.g., methyl group) substituted on a main chain or ring thereof. The diisocyanate(s) may be used singly or in combination.

Examples of the diol may include a polyester diol [for example, a polyester diol (aliphatic polyester diol) derived from an aliphatic dicarboxylic acid component (e.g., a $C_{4-12}$aliphatic dicarboxylic acid such as adipic acid), an aliphatic diol component (e.g., a $C_{2-12}$aliphatic diol such as ethylene glycol, propylene glycol, butanediol, or neopentyl glycol), and/or a lactone component (e.g., a $C_{4-12}$actone such as ε-caprolactone), e.g., a poly(ethylene adipate), a poly(1,4-butylene adipate), and a poly(1,6-hexylene adipate), and a poly-ε-caprolactone], a polyether diol [for example, an aliphatic polyether diol, e.g., a poly(oxy$C_{2-4}$alkylene) glycol such as a polyethylene glycol, a poly(oxytrimethylene) glycol, a polypropylene glycol, or a polytetramethylene ether glycol, and a block copolymer of the poly(oxyalkylene) glycol (e.g., a polyoxyethylene-polyoxypropylene block copolymer); an aromatic polyether diol, e.g., an adduct of an aromatic diol with an alkylene oxide, such as a bisphenol A-alkylene oxide adduct (e.g., an adduct of a $C_{2-4}$alkylene oxide such as ethylene oxide, or propylene oxide)]; a polyester ether diol (a polyester diol obtained by using the polyether diol as a part of a diol component); and others. The diol(s) may be used singly or in combination. Among these diols, the polyester diol, or the polyether diol such as a polytetramethylene ether glycol (particularly, a polyester diol) is used in many cases.

As the chain-extension agent, there may be used a glycol [for example, a short chain glycol, e.g., a $C_{2-10}$alkanediol such as ethylene glycol, propylene glycol, 1,4-butanediol, or 1,6-hexanediol; bishydroxyethoxybenzene (BHEB)], and in addition a diamine [for example, an aliphatic diamine such as a $C_{2-10}$alkylenediamine, e.g., ethylenediamine, trimethylenediamine, tetramethylenediamine, or hexamethylenediamine; an alicyclic diamine such as isophorone diamine; an aromatic diamine such as phenylenediamine, or xylylenediamine]. The chain-extension agent(s) may be used singly or in combination.

The thermoplastic polyurethane-series resin may also include a perfect thermoplastic polyurethane obtained by using a diol and a diisocyanate at a substantially equivalent amount, in addition an imperfect or terminal isocyanate-group containing thermoplastic polyurethane (polyisocyanate) having a small amount of a residual free (or unreacted) isocyanate, which is obtained by using a slightly excess amount of a diisocyanate relative to a diol, and a terminal hydroxyl-group containing thermoplastic polyurethane obtained by using a slightly excess amount of a diol relative to a diisocyanate.

Among the thermoplastic polyurethane-series resins, in particular, it is preferred the thermoplastic polyurethane elastomer which is obtained by using a diol (e.g., a diol having a polyester unit or a polyether unit), a diisocyanate, and a glycol (e.g., a short chain glycol) as the chain-extension agent. The thermoplastic polyurethane elastomer comprises a hard segment (hard block) which is composed of a polyurethane with the use of a glycol and a diisocyanate, and a soft segment (soft block) composed of an aliphatic polyether diol (e.g., a poly(oxyethylene) glycol), an aliphatic polyester diol or others. The polyurethane elastomer may include a polyester urethane elastomer, a polyether urethane elastomer, and others, depending on the species of the soft segment. As the thermoplastic polyurethane-series resin, above all, a polyester-polyurethane (particularly a polyester urethane elastomer) obtained by using a polyester diol is preferably used. These thermoplastic polyurethane-series resins can be used singly or in combination.

Incidentally, in the molded composite article (IIa), the thermoplastic polyurethane-series resin for joining with a non-urethane-series thermoplastic resin (IIb) having a polyether segment has at least a polyether segment.

In the thermoplastic polyurethane-series resin constituting the resin member, the proportion of the polyether segment relative to the whole thermoplastic polyurethane-series resin, may for example be about 10 to 90% by weight, preferably about 20 to 90% by weight, and more preferably about 30 to 90% by weight.

The thermoplastic polyurethane-series resin having a polyether segment can be obtained, for example, by reaction of the diisocyanate with the diol having a polyether unit, if necessary, with the chain-extension agent.

As the diol having a polyether unit, there can be used a polyether diol [e.g., an aliphatic polyether diol, for example, a poly(oxy$C_{2-4}$alkylene) glycol such as a polyethylene glycol, a poly(oxytrimethylene) glycol, a polypropylene glycol, or a PTMG; a block copolymer of the poly(oxyalkylene) glycols (e.g., a polyoxyethylene-polyoxypropylene block copolymer); an aromatic polyether diol, for example, an adduct of an aromatic diol with an alkylene oxide, such as bisphenol A-alkylene oxide adduct (e.g., an adduct of a $C_{2-4}$alkylene oxide such as ethylene oxide or propylene oxide)]; a polyester ether diol (e.g., a polyether diol obtained by using a polyester diol (e.g., the below-mentioned polyester diol) as a part of a diol component), and others. These diols can be used singly or in combination. Among these diols, the aliphatic polyether diols such as a polyethylene glycol and a PTMG are preferred.

With the diol having a polyether unit, a polyester diol may be used in combination. The polyester diol may include a polyester diol (e.g., an aliphatic polyester diol) obtained from a $C_{4-12}$aliphatic dicarboxylic acid component (e.g., adipic acid), a $C_{2-12}$aliphatic diol component (e.g., ethylene glycol, propylene glycol, butanediol, and neopentyl glycol), a $C_{4-12}$actone component (e.g., ε-caprolactone), for example, a poly(ethylene adipate), a poly(1,4-butylene adipate), a poly(1,6-hexylene adipate), a poly-ε-caprolactone, and others.

The thermoplastic polyurethane-series resin having a polyether segment may also include a perfect thermoplastic polyurethane obtained by using a diol and a diisocyanate at a substantially equivalent amount, and an imperfect thermoplastic polyisocyanate having a small amount of a residual free (or unreacted) isocyanate, which is obtained by using a slightly excess amount of a diisocyanate relative to a diol.

Among the thermoplastic polyurethane-series resins having a polyether segment, in particular, the thermoplastic polyether urethane elastomer is preferred, which is obtained by using a diol having a polyether unit, a diisocyanate, and a glycol (e.g., a short chain glycol) as the chain-extension agent. The thermoplastic polyether urethane elastomer comprises a hard segment (hard block) which is composed of a polyurethane with the use of a glycol and a diisocyanate, and a soft segment (soft block) composed of an aliphatic polyether diol (e.g., a poly(ethylene) glycol), a PTMG). The thermoplastic polyurethane-series resin may contain at least a PTMG unit as the polyether segment.

The thermoplastic polyurethane-series resin having a polyether segment can be used singly or in combination.

As mentioned in the item of the non-urethane-series thermoplastic resin, the thermoplastic polyurethane-series resin constituting the resin member may contain the amino group- and/or imino group-containing component (particularly an amine compound such as an amino group-containing polyamide oligomer). The proportion of the amino group- and/or imino group-containing component (particularly, an amine compound such as an amino group-containing polyamide oligomer) relative to 100 parts by weight of the thermoplastic polyurethane-series resin having a polyether segment, is, for example, about 0.01 to 10 parts by weight, preferably about 0.1 to 8 parts by weight, and particularly about 0.5 to 7 parts by weight.

In such a range that the effects of the present invention are not deteriorated, the thermoplastic polyurethane-series resin member may comprise other resin (s) (e.g., a thermoplastic resin, particularly a thermoplastic elastomer such as a polyamide-series elastomer, a polyester-series elastomer, or a polyolefinic elastomer), a stabilizer (e.g., a heat stabilizer, an ultraviolet ray absorbing agent, an antioxidant), a plasticizer, a lubricant, a filler, a coloring agent, a flame retardant, an antistatic agent, and others.

In the molded composite article of the present invention, since the non-urethane-series thermoplastic resin (Ib-1) contains a polyamide component having an alicyclic ring, or since the non-urethane-series thermoplastic resin composition (Ib-2) contains an amino group, the non-urethane-series thermoplastic resin (composition) firmly joins or bonds with the thermoplastic polyurethane-series resin without using an adhesive. Moreover, since both polyamide-series resin and thermoplastic polyurethane-series resin have a polyether segment in the molded composite article of the present invention, and since the affinity between both resins is high, the polyamide-series resin and the thermoplastic polyurethane-series resin are firmly joined together without an adhesive.

In the molded composite article, the bonded strength or joined strength is usually not less than 30 N/cm, and cohesive failure sometimes occurs along with separation of the resin member formed with the non-urethane-series thermoplastic resin, (e.g., a hard resin member) from the thermoplastic polyurethane-series resin member (e.g., a soft resin member). The bonded strength of such a molded composite article is usually 30 N/cm to cohesive failure, preferably not less than 40 N/cm, and particularly not less than 50 N/cm (not less than 50 N/cm to cohesive failure).

[Production Process of Molded Composite Article]

The molded composite article of the present invention may be produced by joining the non-urethane-series thermoplastic resin with the thermoplastic polyurethane-series resin under heating. The joining may be usually ensured by heating at least one resin of the present invention, i.e., at least one resin selected from the non-urethane-series thermoplastic resin (or resin composition) and the thermoplastic polyurethane-series resin to be molten, and bringing one resin in the molten state into contact with the other resin. Such a molded composite article may be produced by joining the non-urethane-series thermoplastic resin with the thermoplastic polyurethane-series resin in a molding process by means of a conventional molding method such as a thermoforming (e.g., a heat press molding, an injection press molding), an injection molding (e.g., an insert injection molding, a two-color (or double) injection molding, a core-back injection molding, a sandwich injection molding), an extrusion molding (e.g., a co-extrusion molding, a T-die lamination molding), or a blow molding.

For example, in a molding method such as an insert injection molding or an injection press molding, the both resins may be joined together by heating and melting the thermoplastic polyurethane-series resin, and molding the thermoplastic polyurethane-series resin in a molten state with contacting with at least a part of a resin member composed of the non-urethane-series thermoplastic resin (hereinafter, sometimes simply refers as a non-urethane-series resin member). The both resins may also be joined together by heating the non-urethane-series thermoplastic resin to be molten, and bringing the non-urethane-series thermoplastic resin in the molten state into contact with at least a part of a resin member composed of the thermoplastic polyurethane-series resin (hereinafter, sometimes simply refers as a polyurethane-series resin member). Moreover, in a molding method such as a double injection molding or a co-extrusion molding, joining of the both resins may be ensured by heating and melting both the non-urethane-series thermoplastic resin and the thermoplastic polyurethane-series resin differently, and molding the molten non-urethane-series thermoplastic resin and the molten thermoplastic polyurethane-series resin with contacting with each other. A molded composite article in which the non-urethane-series thermoplastic resin member is firmly joined to the polyurethane-series resin member can be obtained by melting at least one resin selected from the non-urethane-series thermoplastic resin and the polyurethane-series resin, bringing the non-urethane-series thermoplastic resin into contact with the thermoplastic polyurethane-series resin for joining, and usually cooling the resulting matter. Moreover, depending on a purpose and an application, it is sufficient to join the non-urethane-series resin member to the thermoplastic polyurethane-series resin member at least in part.

Incidentally, the resin constituting the resin member (particularly, base resin) can be molten by heating to a temperature of not less than a melting point thereof. In the case of a substantially uncrystallized resin, the resin can be molten by heating to a temperature of not less than a glass transition point (Tg) thereof.

According to the present invention, in the non-urethane-series thermoplastic resin composition containing a non-urethane-series thermoplastic resin and an amino group-containing compound, or a non-urethane-series thermoplastic resin containing an alicyclic polyamide component, since the non-urethane-series thermoplastic resin contains an amino group (e.g., an amino group derived from an amino group-containing compound, or an amino group which the resin itself contains) and the amino group acts (chemically acts) on the thermoplastic polyurethane-series resin, the bonded strength can be significantly improved even in a molded composite article obtained from a different kind of materials, and such a high-level bonded strength cannot be obtained from a physical action caused by simple thermal fusing or welding. Moreover, in the non-urethane-series thermoplastic resin containing an alicyclic polyamide component, since an alicyclic ring of the alicyclic polyamide component acts on the thermoplastic polyurethane-series resin, the bonded strength can be significantly improved even in a molded composite article obtained from a different kind of materials, and such a high-level bonded strength cannot be obtained from a physical action caused by simple thermal fusing or welding. Furthermore, in the combination of the polyamide-series resin with the thermoplastic polyurethane-series resin each having polyether segments, high affinity between both resins drastically improves bonded strength between resin members even in the molded composite article using different materials. Therefore, throughout of this specification, "thermal fusing" includes not only simple thermal fusing, but also thermal fusing (thermal joining) including a chemical reaction.

As described above, it is not particularly limited which of the resins between the non-urethane-series thermoplastic resin and the polyurethane-series resin is molten. A soft resin (the polyurethane-series resin) having a usually lower melting point or glass transition point (Tg) may be heated, and may be joined to a hard resin member comprising a hard resin (the non-urethane-series thermoplastic resin) having a higher melting point or Tg. Moreover, a hard resin (the non-urethane-series thermoplastic resin) having a generally higher melting point or Tg may be heated, and may be joined to a soft resin member comprising a soft resin (the polyurethane-series resin) having a lower melting point or Tg.

Among these methods, in particular, the former method has an advantage over conventional techniques since the effects of the present invention are characteristically and effectively exhibited. In the conventional method using simple physical thermal fusing, when letting a precedently molded non-urethane-series resin member joined with a followingly molding polyurethane-series resin, the molding temperature of the polyurethane-series resin becomes lower than the melting point of the precedently molded non-urethane-series thermoplastic resin in many cases, and therefore thermal fusing is difficult to proceed. Moreover, even when the molding temperature of the polyurethane-series resin is higher than the melting point of the non-urethane-series thermoplastic resin, the heat quantity is often insufficient to melt the surface of the non-urethane resin member. Therefore, the conventional techniques usually never comprise such a manner as molding the non-urethane-series resin member before molding the polyurethane-series resin. However, according to the present invention, even in such a case, the non-urethane-series thermoplastic resin and the thermoplastic polyurethane-series resin can be more easily joined together by an action of the amino group, the alicyclic ring, or the polyether segment contained in the non-urethane-series thermoplastic resin. Accordingly, the present invention can increase the freedom of the production process of the molded composite article and can also rationalize the process step to a large degree. In the non-urethane-series thermoplastic resin composition comprising the non-urethane-series thermoplastic resin and the amino group-containing compound, even in the species of the polyurethane resin is freely chosen with no distinction between polyether-series and polyester-series polyurethane resins, thereby such a resin composition extremely contributes to reductions in material cost. Moreover, in the case where the non-urethane-series thermoplastic resin contains an alicyclic polyamide component, the present invention can also provide high freedom of choice of the species of the polyurethane-series resin, for example both polyether-series polyurethane and polyester-series polyurethane can be used without any distinction.

In the molded composite article, although the hard resin usually comprises the non-urethane-series thermoplastic resin and the soft resin usually comprises the thermoplastic polyurethane-series resin in practical cases, the hard resin may comprise the thermoplastic polyurethane-series resin and the soft resin may comprise the non-urethane-series thermoplastic resin. Moreover, the hardness of the non-urethane-series thermoplastic resin may be the same level as that of the thermoplastic polyurethane-series resin.

To be more precise, in the heat press molding, a molded composite article may be produced by melting at least one resin of the hard resin (or composition) and the soft resin (or composition) in a metal mold of the press molding, bringing the both resins into contact with each other under an applied pressure, and joining the resins to each other. In the heat press molding, the hard resin and/or the soft resin may be filled in the metal mold in a pellet form, a powdered form or other form(s), or may be loaded to the metal mold as a molded article precedently formed by other molding method.

In the insert injection molding, a molded composite article may be produced by molding any one of the hard resin (or resin composition) or the soft resin (or resin composition) with the use of a molding method (such as an injection molding, an extrusion molding, a sheet molding, or a film molding), inserting or putting thus shaped molded article in a metal mold, and then injecting the other resin to the space or cavity between the molded article and the metal mold. In the insert injection molding, the molded article to be inserted in the metal mold is preferably pre-heated.

In the two-color (or double) injection molding, a molded composite article may be produced by injecting any one component of the hard resin (or resin composition) or the soft resin (or resin composition) to a metal mold by means of two injection molding machines or more, and exchanging cavity of the metal mold by rotation or movement of the metal mold, and injecting the other component to the space or cavity between thus obtained molded article and the metal mold.

In the core-back injection molding, a molded composite article may be produced by injecting any one component of the hard resin (or resin composition) or the soft resin (or resin composition) in a metal mold, enlarging the cavity of the metal mold, and injecting the other component to the space or cavity between thus obtained molded article and the metal mold.

Among these molding methods, particularly from the viewpoint of mass production or other properties, suitable methods are, for example, the heat press molding such as injection press molding, and the injection molding (e.g., insert injection molding, double injection molding, core-back injection molding, sandwich injection molding).

In the thermal fusing, the melting temperature (or thermal fusing temperature) of the hard resin and/or soft resin may be selected depending on the species of the both resins (or resin compositions), and may for example be selected within a range of about 100 to 300° C., preferably about 120 to 290° C., and more preferably about 150 to 280° C. For example, in the heat press molding, the melting temperature may be about 100 to 250° C., preferably about 120 to 230° C., and more preferably about 150 to 220° C. Moreover, in the injection molding, the temperature of the resin in the molding cylinder may for example be about 200 to 300° C., preferably about 220 to 280° C., and more preferably about 240 to 280° C.

The structure and configuration of the molded composite article is not particularly limited to a specific one, and may be a structure suitable for design, decorative property, touch or others. For example, such a structure may be obtained by coating or laminating a part or all of the soft resin member with the hard resin member, and usually, preferably obtained by coating or laminating a part or all of the hard resin member with the soft resin member (for example, obtained by coating part of the hard resin member, which contacts with human body (such as a hand), with the soft resin member). Moreover, the concrete structure includes, for example, a two-dimensional structure (such as a sheet-like form, or a plate-like form), and a three-dimensional structure (such as a stick-like form, a tube-like form, a casing, or a housing).

According to the present invention, the hard resin and the soft resin can be directly and firmly joined together by thermal fusing without (going through) complicated production steps (e.g., a step for creating a concavo-convex site in the composite area, a step for coating an adhesive). Therefore, the present invention ensures to obtain a lightweight and strong molded composite article improved in properties such as design, decorative property, or good touch or texture (e.g., soft texture, flexibility).

INDUSTRIAL APPLICABILITY

The resin (or resin composition) of the present invention is advantageously used for directly joining or bonding to a thermoplastic polyurethane-series resin to form a molded composite article in which the present resin (or resin composition) is directly joined or bonded to a thermoplastic polyurethane-series resin. Moreover, the obtained molded composite article may be used as various industrial components (or parts), for example, an automotive part (e.g., an automotive interior part such as an instrument panel, a center panel, a center console box, a door trim, a pillar, an assist grip, a steering wheel, or an air bag cover; an automotive exterior part such as a lacing, or a bumper; and an automotive functional component such as a rack and pinion boot, a suspension boot, or a constant velocity joint boot), a household electrical part (e.g., a cleaner bumper, a switch of a remote control, and a key top of office automation (OA) apparatus), a product to be used in water (e.g., swimming goggles, and a cover of a underwater camera), an industrial part (a cover part; various industrial parts equipped with a packing for the purpose of sealing property, water proofing property, sound insulating property, vibration insulating property, or other properties; and an industrial rubber roller), an electric or electronic device part (e.g., a curl cord wire covering, a belt, a hose, a tube, and a sound deadening gear), sports goods, shoes goods (e.g., athletic shoes, a shoe sole), and a part requiring design or decorative property (e.g., dark glasses and glasses).

Among them, the molded composite article is particularly suitable for a constitutive member of the shoe or the mechanical part such as the roll (e.g., a rubber roller). The constitutive member of the shoe includes a shoe part such as a shoe sole (sole), or a shoe upper, and others. Moreover, the molded composite article may form (or constitute) athletic shoes, work shoes (e.g., boots, rain shoes, shoes for gardening). In such a shoe application, since a combination of a hard or glass fiber-reinforced polyamide-series resin and a soft polyurethane-series resin, which was difficult in the past, becomes easy, it is, for example, possible to compound different grades of materials in many layers. Accordingly, the molded composite article greatly contributes to improvement in design or functionality of the shoe.

Further, in the roll (e.g., a rubber roller) application, for example, the roll may comprise an axis (shaft) in which at least the surface layer comprises a non-urethane-series thermoplastic resin (composition), and a thermoplastic polyurethane-series resin layer formed along the surrounding surface of the axis. The axis may be obtained by forming a non-urethane-series thermoplastic resin layer on the surface of the metal shaft, or may be an axis comprising a non-urethane-series thermoplastic resin. In such a roller application, since a cutting finish for obtaining a shaft precision and a surface finish of a thermoplastic polyurethane-series resin can be conducted in one operation by the same grinding machine, the production process of the roller can be significantly abbreviated and the cost can be exponentially reduced. Moreover, since such a roller given by chemically joining has high bonded strength and merely has the space or cavity between the axis and the roll, the roller can tolerate the usage in a high torque.

EXAMPLES

The following examples are intended to describe this invention in further detail and should by no means be interpreted as defining the scope of the invention.

Example 1

(i) Preparation of an Alicyclic Polyamide

In an autoclave substituted with nitrogen gas, a salt (1000 g) of bis(4-aminocyclohexyl)methane and dodecanedicarboxylic acid was heated at 220° C. under an applied pressure (1.7 MPa), and water in the reaction system was discharged with the nitrogen gas from the reaction system over 4 hours. Subsequently, the temperature of the system was gradually increased up to 275° C. over 1 hour, and residual water was perfectly removed to outside of the system. Thereafter, the inner pressure of the autoclave was reduced to an atmospheric pressure. After cooling, a transparent polyamide (polymer 1) having a number average molecular weight of about 23000 and a terminal amino group concentration of 43 mmol/kg was obtained. The ratio of a monomer residue having an alicyclic amino group relative to other monomer residues in the polymer 1 (hereinafter refers to as "MR value") was calculated as the former/the latter=50/50.

(ii) Production of the Molded Composite Article

With the polymer 1 obtained in the above (i), a flat plate having 100 mm width, 100 mm long and 2 mm thick was produced by an injection molding, and the surface of one-fifth in the above polyamide molded article (about 20 mm width from the edge) was covered with an aluminum foil. Subsequently, the covered article was placed in a flat metal mold having 100 mm width, 100 mm long and 4 mm depth, and the thermoplastic polyurethane resin was injected into the void of the metal mold. The injection molding of the polyurethane resin was conducted at a cylinder temperature of 205° C. and a metal mold temperature of 60° C. Incidentally, two kinds of the polyurethane resins were used, that is, polyether-series polyurethane resin (produced by BASF, Erastollan, 1195ATR) and polyester-series polyurethane resin (produced by BASF, Erastollan, ET195). By using the molded composite articles obtained from each of the polyurethane resins, the peeling test was conducted.

(iii) Evaluation of Thermal Fusing (Peeling Test)

The obtained molded composite articles were cut into a size of 20 mm in width and 100 mm in length, and the covered part was used as a tong hold in the peeling test. In each cut piece, the tensile test was conducted by drawing the tong hold to 180° direction at a drawn speed of 20 mm/minute. Through the tensile test, the peel strength in the fusing interfaces between the non-urethane-series thermoplastic resin member and the urethane-series thermoplastic resin member was measured. On the basis of the peel strength, the thermal fusing property (bonded strength) between the non-urethane-series thermoplastic resin member and the urethane-series thermoplastic resin member was evaluated.

In general, with respect to adhesive strength, the peel in which a peel strength is less than 50 N/cm is usually regarded as an interfacial peel. In such a case, the adhesion is determined as binding defective in many purposes because the bonded matter can be peeled by hand. The peel in which a peel strength is over 50 N/cm falls under the realm of peel including a cohesive failure. Namely, the bonded matters is scarcely peelable to be peeled by hand, and such a bonded strength is sufficiently adaptable for industrial purposes. The peel in which a peel strength from 80 N/cm and to 100 N/cm falls under a cohesive failure throughout the molded article, and the molded article is suitable for purposes including an athletic shoe to endure severe bending fatigue.

Comparative Example 1

A polyamide was prepared by polymerization in the same manner as in Example 1 except that hexamethylenediamine was used instead of bis(4-aminocyclohexyl)methane. The obtained polyamide 612 (polymer 2) had a number average molecular weight of about 20000, and a terminal amino group concentration of 51 mmol/kg. The MR value of the polyamide 612 (polymer 2) was 0/100. Moreover, a molded composite article was produced and peeling test was conducted in the same manner as in Example 1 except that polymer 2 was used instead of polymer 1.

Example 2

In an autoclave in which the air had been substituted with nitrogen gas, ω-lauryllactam (1000 g), dodecanedicarboxylic acid (15 g), and a small amount of phosphoric acid were heated at 250° C. under an applied pressure (1.8 MPa) with stirring. After 4 hour stirring, into the resultant mixture was added bis(4-aminocyclohexyl)methane, and the reaction was further continued at 280° C. for 0.5 hour. Then the reaction mixture was started to be cooled, and a transparent polyamide 12 (polymer 3) having cyclohexylamino group was obtained. The polyamide 12 (polymer 3) had a number average molecular weight of about 15000 and a terminal amino group concentration of 60 mmol/kg. The MR value was calculated as 1.2/98.8.

Further, a molded composite article was produced and peeling test was conducted in the same manner as in Example 1 except that polymer 3 was used instead of polymer 1.

Comparative Example 2

In an autoclave in which the air had been substituted with nitrogen gas, ω-lauryllactam (1000 g), dodecanedicarboxylic acid (15 g), and a small amount of phosphoric acid were heated at 250° C. under an applied pressure (1.8 MPa), and water in the system was discharged outside of the system with nitrogen gas over 4 hours with stirring. Subsequently, the temperature of the system was leisurely increased up to 275° C., and water remaining in the system was completely removed out of the system. Then the inside pressure of the autoclave was returned to a normal pressure. After cooling, a polyamide 12 (polymer 4) having a number average molecular weight of about 15000 was obtained. The polyamide 12 (polymer 4) had a terminal amino group of an aliphatic chain amino group, and the terminal amino group concentration was 7 mmol/kg. Further, the MR value of the polymer 4 was 0/100.

A molded composite article was produced and peeling test was conducted in the same manner as in Example 1 except that polymer 4 was used instead of polymer 1.

Example 3

The transparent polyamide (polymer 1) (60 parts by weight) obtained in Example 1 was mixed with the polyamide 12 (polymer 4) obtained in Comparative Example 2 (40 parts by weight), and the mixture was kneaded with a biaxial extruder to obtain a polyamide alloy (polymer 5). The polyamide alloy (polymer 5) had a terminal amino group concentration of 29 mmol/kg, and the MR value of 29/71.

A molded composite article was produced and peeling test was conducted in the same manner as in Example 1 except that polymer 5 was used instead of polymer 1.

Example 4

The alicyclic amino group-containing polyamide 12 (polymer 3) (40 parts by weight) obtained in Example 2 was mixed with the polyamide 12 (polymer 4) obtained in Comparative Example 2 (40 parts by weight) which did not have the alicyclic amino group, and the mixture was kneaded with a biaxial extruder to obtain a polyamide 12 mixture (polymer 6). The polyamide 12 mixture (polymer 6) had a terminal amino group concentration of 28 mmol/kg, and the MR value of 0.4/99.6.

A molded composite article was produced and peeling test was conducted in the same manner as in Example 1 except that polymer 6 was used instead of polymer 1.

Example 5

A polyamide elastomer (manufactured by Degussa, Vestamid E47S3) (80 parts by weight) was mixed with the polyamide 12 (polymer 3) (20 parts by weight) obtained in Example 2, and the mixture was kneaded with a biaxial extruder to obtain a blended polyamide elastomer (polymer 7). The mixed polyamide elastomer (polymer 7) had a terminal amino group concentration of 15 mmol/kg, and the MR value of 0.14/99.86.

A molded composite article was produced in the same manner with Example 1 except that the polymer 7 was used as well as the polyether-series polyurethane resin (manufactured by BASF, Erastollan, ET880) or the polyester-series polyurethane resin (manufactured by Japan Polyurethane Industry Co. Ltd., Mirastollan E585) was used as a polyurethane resin with the polymer, and peeling test was conducted. The obtained results are shown in Table 1.

Example 6

The peeling test between a polyamide elastomer (manufactured by Degussa, Vestamid E47S3) and a polyurethane resin was conducted in the same way with Example 5, and the obtained results are shown in Table 1. The terminal amino group concentration of the used polyamide elastomer was 4 mmol/kg, and the MR value was 0/100.

As shown in the results in Table 1, the molded composite articles of Examples showed high peel strength independent of kinds of polyurethane. On the contrary, molded composite article of Comparative Examples 1 and 2 showed low peel strength, and the sheet of Example 6 had low peel strength to the polyester-series polyurethane.

Examples 7 to 13 and Comparative Example 3

(1) Preparation of Non-Urethane-Series Thermoplastic Resin (i) To 100 parts by weight of a polyamide 12 (number average molecular weight: 19,000, amino group concentration: 8 mmol/kg), was added 5 parts by weight of a polyamide 12 oligomer (number average molecular weight: 3,000, amino group concentration: 530 mmol/kg), the resultant was mixed with a biaxial extruder to obtain a non-urethane-series thermoplastic resin (A1) (amino group concentration: 20 mmol/kg).

(ii) A non-urethane-series thermoplastic resin (A2) (amino group concentration: 40 mmol/kg) was obtained in the same manner with the above (i) except that hexamethylenediamine (0.5 parts by weight) was used instead of the polyamide 12 oligomer.

(iii) Non-urethane-series thermoplastic resin (A3) (amino group concentration: 100 mmol/kg) was obtained in the same manner with the above (i) except that amino group-modified polyether (Sanamyl TAP-10, manufactured by Sanyo Chemical Industries, Ltd.) (5 parts by weight) was used instead of the polyamide 12 oligomer.

(iv) Non-urethane-series thermoplastic resin (A4) (amino group concentration: 35 mmol/kg) was obtained in the same manner with the above (i) except that polyamide 6 (number average molecular weight: 23,000, amino group concentration: 17 mmol/kg) (100 parts by weight) was used instead of the polyamide 12.

(v) To a polyester elastomer (Hytrel, manufactured by DU PONT-TORAY CO., LTD) (100 parts by weight), was added a polyamide 12 oligomer (number average molecular weight: 3,000, amino group concentration: 530 mmol/kg) (5 parts by weight), the resultant was mixed with a biaxial extruder to obtain a non-urethane-series thermoplastic resin (A5) (amino group concentration: 15 mmol/kg).

(vi) A non-urethane-series thermoplastic resin (A6) (amino group concentration: 15 mmol/kg) was obtained in the same manner with the above (v) except that a polycarbonate (Iupilon, manufactured by Mitsubishi Engineering-Plastics Corporation) (100 parts by weight) was used instead of the polyester elastomer.

TABLE 1

| | Polymer | Terminal amino group conc. | MR value | Peel strength N/cm | |
|---|---|---|---|---|---|
| | | | | Polyether-series polyurethane | Polyester-series polyurethane |
| Ex. 1 | Polymer 1 | 43 | 50/50 | 140 | 133 |
| Com. Ex. 1 | Polymer 2 | 51 | 0/100 | 70 | 62 |
| Ex. 2 | Polymer 3 | 60 | 1.2/98.8 | 130 | 145 |
| Com. Ex. 2 | Polymer 4 | 7 | 0/100 | 15 | 10 |
| Ex. 3 | Polymer 5 | 29 | 29/71 | 112 | 127 |
| Ex. 4 | Polymer 6 | 28 | 0.4/99.6 | 70 | 58 |
| Ex. 5 | Polymer 7 | 15 | 0.14/99.86 | 95 | 76 |
| Ex. 6 | E47S3 | 4 | 0/100 | 90 | 24 |

(vii) A non-urethane-series thermoplastic resin (A7) (amino group concentration: 15 mmol/kg) was obtained in the same manner with the above (v) except that a polyphenylene sulfide (Fortron, manufactured by Polyplastics Co. Ltd.) (100 parts by weight) was used instead of the polyester elastomer.

(viii) As a comparison, a polyamide 12 having an amino group concentration of 5 mmol/kg was singly used (non-urethane-series thermoplastic resin (A8)).

(2) Production of Molded Composite Article and Peeling Test Thereof

With an ester-series thermoplastic polyurethane elastomer TPU (ET195, manufactured by BASF), a flat plate having 120 mm width, 25 mm long and 2 mm thick was produced with an injection molding machine. The flat plate was placed in a metal mold for injection molding having 120 mm width, 25 mm long and 4 mm thick, and injection molding of the non-urethane-series thermoplastic resin or resin composition obtained in the above (1) was carried out under a condition of a joining temperature (cylinder temperature) of 250° C. and a metal mold temperature of 60° C. to obtain a molded composite article.

Thus obtained molded composite articles were cut to a piece having 100 mm length and 20 mm width. The part covered with aluminum foil was used as a tong hold, and the tensile test was conducted by drawing the tong hold to 180° direction at a drawn speed of 20 mm/minute. Through the tensile test, the peel strength in the fusing interface between the non-urethane-series thermoplastic resin member and the urethane-series thermoplastic resin member was measured. On the basis of the peel strength, the thermal fusing property between the resin members was evaluated.

The results are shown in Table 2.

TABLE 2

|  | Non-urethane-series thermoplastic resin | Amino group concentration (mmol/kg) | Peel strength (N/cm) |
| --- | --- | --- | --- |
| Ex. 7 | A1 | 20 | 130 |
| Ex. 8 | A2 | 40 | 110 |
| Ex. 9 | A3 | 100 | 130 |
| Ex. 10 | A4 | 35 | 110 |
| Ex. 11 | A5 | 15 | 80 |
| Ex. 12 | A6 | 15 | 70 |
| Ex. 13 | A7 | 15 | 80 |
| Com. Ex. 3 | A8 | 5 | 30 |

As apparent from the Table, the molded composite articles of Examples 7 to 13 were joined with higher bonded strength than the Comparative Example 3 which did not contain any amino compound.

Examples 14 to 21 and Comparative Examples 4 to 5

(1) Preparation of Polyamide Resin

Polyamide elastomers or a polyamide to be used were prepared in the following procedure.

(i) Polyamide Elastomer (A9)

Lauryllactam (500 g) and dodecanedioic acid (50 g) were added into a pressure ve (about 2 MPa) for 3 hours under nitrogen gas flow. A polytetramethylene ether glycol (which has a molecular weight of 1300 and hydroxyl groups as both ends) (500 g) was added to thus obtained mixture, and stirred for 5 hours with heating under a reduced pressure to obtain a polyamide elastomer (A9).

(ii) Polyamide Elastomer (A10)

A polyamide elastomer (A10) was prepared in the same manner with the above (A9) except that lauryllactam (800 g), dodecanedioic acid (90 g) and a polytetramethylene ether glycol (320 g) were used.

(iii) Polyamide Elastomer (A11)

A polyamide elastomer (A11) was prepared in the same manner with the above (A9) except that lauryllactam (300 g) and dodecanedioic acid (30 g) and a polytetramethylene glycol (450 g) were used.

(iv) Polyamide Elastomer (A12)

A polyamide elastomer (A12) was prepared in the same manner with the above (A9) except that lauryllactam (500 g) and dodecanedioic acid (25 g) were used, and that a polypropylene glycol (which has a molecular weight of 1000 and hydroxyl groups as both ends) (500 g) was used instead of the polytetramethylene ether glycol.

(v) Polyamide Elastomer (A13)

A polyamide elastomer (A13) was prepared in the same manner with the above (A12) except that a polyethylene glycol (which has a molecular weight of 1000 and hydroxyl groups as both ends) (500 g) was used instead of the polypropylene glycol.

(vi) Polyamide (B1)

Lauryllactam (1000 g) and dodecanedioic acid (110 g) were heated to 250 to 260° C. in the presence of a small amount of phosphoric acid in an autoclave substituted with nitrogen gas, followed by water in the system together with nitrogen gas to discharge out of the system over 4 hours. Then, the system was cooled to give a comparative polyamide (B1).

(2) Production of Molded Composite Article

A molded article (flat plate having 100 mm width, 100 mm long and 2 mm thick) was formed by injection molding with the polyamide elastomers or polyamides in the above (1), and the surface of about one-forth in the above molded article (about 20 mm width from the edge) was covered with an aluminum foil. Subsequently, a covered resin member was placed in a flat plate metal mold having 100 mm width, 100 mm long and 4 mm depth, and the thermoplastic polyurethane (TPU) was injection-molded into the void of the metal mold to give a molded composite article. The injection molding of the TPU was conducted at a cylinder temperature of 205° C. and a metal mold temperature of 60° C.

Incidentally, a polyether-series thermoplastic polyurethane C1 (Erastollan, ET890, manufactured by BASF) or a polyether-series thermoplastic polyurethane C2 (Erastollan, 1195ATR, manufactured by BASF) was used as the above TPU.

(3) Evaluation of Thermal Fusing (Peeling Test)

The molded composite articles obtained in Examples and Comparative Examples were cut into a size of 20 mm in width and 100 mm in length, and the covered part was used as a tong hold in the peeling test. In each cut piece, the tensile test was conducted by drawing the tong hold to 180° direction at a drawn speed of 20 mm/minute. Through the tensile test, the peel strength in the fusing interfaces between the non-urethane-series thermoplastic resin member and the urethane-series thermoplastic resin member was measured. On the basis of the peel strength, the thermal fusing property (bonded strength) between the hard resin member and the soft resin member was evaluated.

The results are shown in Table 3.

TABLE 3

|  | Polyamide elastomer | Polyurethane | Peel strength (N/cm) |
|---|---|---|---|
| Ex. 14 | A9 | C1 | 140 |
| Ex. 15 | A10 | C1 | 90 |
| Ex. 16 | A11 | C1 | 180 |
| Ex. 17 | A12 | C1 | 130 |
| Ex. 18 | A13 | C1 | 130 |
| Ex. 19 | A9 | C2 | 140 |
| Ex. 20 | A10 | C2 | 100 |
| Ex. 21 | A13 | C2 | 140 |
| Com. Ex. 4 | B1 | C1 | 16 |
| Com. Ex. 5 | B1 | C2 | 10 |

As apparent from Table 3, Comparative Examples using polyamide-series resins (which did not contain a polyether segment as the non-urethane-series thermoplastic resin) had extremely lower peel strength than Examples in which both the non-urethane-series thermoplastic resin and the thermoplastic polyurethane-series resin contained a polyether segment.

The invention claimed is:

1. A molded composite article in which a resin member comprising a non-urethane thermoplastic resin and a resin member comprising a thermoplastic polyurethane resin are directly bonded with each other, wherein
the non-urethane thermoplastic resin is a non-urethane thermoplastic resin (Ib) which is (Ib-1) a polyamide resin comprising a polyamide component having an alicyclic ring and contains a terminal amino group in a concentration of not less than 15 mmol/kg, wherein a part of or all the terminal amino group is an alicyclic amino group, or (Ib-2) a resin composition comprising a non-urethane thermoplastic resin and an amino group-containing compound,
the non-urethane thermoplastic resin (Ib) has an amino group in a concentration of not less than 15 mmol/kg,
in the polyamide resin (Ib-1), the polyamide component having an alicyclic ring is at least one member selected from the group consisting of
an alicyclic polyamide resin,
an alicyclic polyamide elastomer, and
a polyamide component having an alicyclic ring comprising an alicyclic polyamide component and a non-alicyclic polyamide component, wherein said alicyclic polyamide component is at least one member selected from the group consisting of an alicyclic polyamide resin, an alicyclic polyamide elastomer and an alicyclic polyamide oligomer; and said non-alicyclic polyamide component is at least one member selected from the group consisting of an aliphatic polyamide resin and an aromatic polyamide resin,
in the resin composition (Ib-2), the non-urethane thermoplastic resin comprises at least one member selected from the group consisting of a polyamide resin, a polyester resin, a polycarbonate resin, and a polyphenylene sulfide resin,
the amino group-containing compound is a polyamide oligomer having a number average molecular weight of 2000 to 9000, and
the thermoplastic polyurethane resin is a thermoplastic polyurethane elastomer.

2. The molded composite article according to claim 1, wherein in the non-urethane thermoplastic resin (Ib-1), the polyamide component having an alicyclic ring is obtained by using an alicyclic diamine as a diamine component.

3. The molded composite article according to claim 1, wherein the non-urethane thermoplastic resin (Ib) is the non-urethane thermoplastic resin (Ib-1) comprising a polyamide resin, and the proportion (molar ratio) of an alicyclic monomer residue relative to other monomer residue in all polyamide components constituting the polyamide resin is 100/0 to 0.1/99.9.

4. The molded composite article according to claim 1, wherein the non-urethane thermoplastic resin (Ib) is the resin composition (Ib-2).

5. The molded composite article according to claim 1, wherein in the resin composition (Ib-2), the amino group-containing compound has a plurality of primary amino groups in the molecule.

6. The molded composite article according to claim 1, wherein in the resin composition (Ib-2), the amino group-containing compound has an amino group in a concentration of 40 to 1000 mmol/kg.

7. The molded composite article according to claim 1, wherein in the resin composition (Ib-2), the amino group-containing compound has an amino group in a concentration of 50 to 700 mmol/kg.

8. The molded composite article according to claim 1, wherein the non-urethane thermoplastic resin (Ib) is the resin composition (Ib-2), and the proportion of the amino group-containing compound is 0.01 to 20 parts by weight relative to 100 parts by weight of the non-urethane thermoplastic resin.

9. The molded composite article according to claim 1, wherein the non-urethane thermoplastic resin (Ib) is the resin composition (Ib-2) and the non-urethane thermoplastic resin is at least one selected from the group consisting of a polyamide resin, a polyester resin, and a polyphenylene sulfide resin.

10. The molded composite article according to claim 1, wherein the resin member comprising the non-urethane thermoplastic resin (Ib) is directly joined to the resin member comprising at least one thermoplastic polyurethane resin selected from the group consisting of a polyester urethane elastomer and a polyether urethane elastomer.

11. The molded composite article according to claim 1, which is a shoe member or a roll member.

12. A process for producing the molded composite article recited in claim 1, which comprises
heating at least one resin selected from the group consisting of the non-urethane thermoplastic resin and the thermoplastic polyurethane resin, and joining the both resins with each other.

13. A process according to claim 12, which comprises
heating at least one resin selected from the group consisting of the bon-urethane thermoplastic resin and the thermoplastic polyurethane resin to be molten, bringing at least one resin in the molten state into contact with the other resin, and
joining both resins with each other.

14. A process according to claim 12, wherein the non-urethane thermoplastic resin and the thermoplastic polyurethane resin are joined with each other in the molding process by a molding method selected from the group consisting of a thermoforming, an injection molding, an extrusion molding, and a blow molding.

* * * * *